US012621722B2

(12) United States Patent
Yang et al.

(10) Patent No.: US 12,621,722 B2
(45) Date of Patent: May 5, 2026

(54) INTER-NETWORK MOBILITY METHOD AND APPARATUS, AND COMMUNICATIONS DEVICE

(71) Applicant: HUAWEI TECHNOLOGIES CO., LTD., Shenzhen (CN)

(72) Inventors: Chenchen Yang, Ottawa (CA); Yinghao Jin, Boulogne Billancourt (FR); Feng Han, Shanghai (CN); Huan Li, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 204 days.

(21) Appl. No.: 17/707,646

(22) Filed: Mar. 29, 2022

(65) Prior Publication Data

US 2022/0225197 A1     Jul. 14, 2022

Related U.S. Application Data

(63) Continuation of application No. PCT/CN2019/109692, filed on Sep. 30, 2019.

(51) Int. Cl.
| | |
|---|---|
| *H04W 36/00* | (2009.01) |
| *H04W 48/10* | (2009.01) |
| *H04W 48/18* | (2009.01) |

(52) U.S. Cl.
CPC ... *H04W 36/0016* (2013.01); *H04W 36/0061* (2013.01); *H04W 48/10* (2013.01); *H04W 48/18* (2013.01)

(58) Field of Classification Search
None
See application file for complete search history.

(56) References Cited

U.S. PATENT DOCUMENTS

| | | | | |
|---|---|---|---|---|
| 2010/0069119 A1* | 3/2010 | Mueck | ................. | H04W 76/27 |
| | | | | 455/561 |
| 2017/0019838 A1* | 1/2017 | Harada | ............... | H04L 25/0224 |

(Continued)

FOREIGN PATENT DOCUMENTS

| | | |
|---|---|---|
| CN | 108337659 A | 7/2018 |
| CN | 109842640 A | 6/2019 |

(Continued)

OTHER PUBLICATIONS

Extended European Search Report issued in European Application No. 19948175.5 on Aug. 2, 2022, 13 pages.

(Continued)

*Primary Examiner* — Scott M Sciacca

(74) *Attorney, Agent, or Firm* — Fish & Richardson P.C.

(57)     ABSTRACT

The present disclosure relates to inter-network mobility methods, apparatus, and communications devices. In one example method, a first access device sends a first indication to a terminal device, where the first indication is used to indicate the terminal device to reserve first information after the terminal device moves from a first network to a network other than the first network, and the first information includes one or more of a context of the terminal device in the first network, information about a signaling radio bearer (SRB) in the first network, information about a data radio bearer (DRB) in the first network, an identifier of the terminal device in the first network, information about a first cell in which the first access device provides a service for the terminal device, an identifier of the first network, or a cause value.

15 Claims, 7 Drawing Sheets

(56)　　　　　References Cited

U.S. PATENT DOCUMENTS

| | | | | |
|---|---|---|---|---|
| 2021/0385700 A1* | 12/2021 | Fu | ..................... | H04W 36/0061 |
| 2022/0167228 A1* | 5/2022 | Li | ........................ | H04W 76/11 |
| 2022/0256416 A1* | 8/2022 | Sharma | ................. | H04W 48/20 |

FOREIGN PATENT DOCUMENTS

| | | | | |
|---|---|---|---|---|
| CN | 110267251 | A | 9/2019 | |
| EP | 2192806 | A2 | 6/2010 | |
| EP | 2871886 | A1 | 5/2015 | |
| WO | 2011041748 | A2 | 4/2011 | |
| WO | 2019041347 | A1 | 3/2019 | |
| WO | WO-2021057332 | A1 * | 4/2021 | ........ H04W 36/0083 |

OTHER PUBLICATIONS

Sony, "Cell selection/reselection with NPN cells," 3GPP TSG RAN WG2 Meeting #107, R2-1909912, Prague, Czech Republic, Aug. 26-30, 2019, 2 pages.

ZTE Corporation et al., "Consideration on the PCI split for the Private Network", 3GPP TSG-RAN WG2 Meeting #107, R2-1909270, Prague, Czech Republic, Aug. 26-30, 2019, 4 pages.

3GPP TS 38.300 V15.7.0 (Sep. 2019), "3rd Generation Partnership Project; Technical Specification Group Radio Access Network; NR; NR and NG-RAN Overall Description; Stage 2 (Release 15)," Sep. 2019, 99 pages.

3GPP TS 38.331 V15.7.0 (Sep. 2019), "3rd Generation Partnership Project; Technical Specification Group Radio Access Network; NR; Radio Resource Control (RRC) protocol specification (Release 15)," Sep. 2019, 527 pages.

NEC, "Cell reselection crossing RAN notification area boundary," 3GPP TSG-RAN WG2 #NR Ad Hoc, R2-1700593, Spokane, USA, Jan. 17-19, 2017, 3 pages.

PCT International Search Report and Written Opinion issued in International Application No. PCT/CN2019/109692 on Jun. 30, 2020, 15 pages (with English translation).

CMCC, "Consideration on public network integrated NPN," 3GPP TSG-RAN WG2 #107, R2-1909471, Prague, Czech Republic, Aug. 26-30, 2019, 11 pages.

EP Communication Pursuant to Article 94(3) EPC in European Appln. No. 19948175.5, mailed on Jul. 10, 2025, 4 pages.

* cited by examiner

INTER-NETWORK MOBILITY METHOD AND APPARATUS, AND COMMUNICATIONS DEVICE

CROSS-REFERENCE TO RELATED APPLICATIONS

This application is a continuation of International Application No. PCT/CN2019/109692, filed on Sep. 30, 2019, which is hereby incorporated by reference in its entirety.

TECHNICAL FIELD

Embodiments of this application relate to the communications field, and more specifically, to an inter-network mobility method and apparatus, and a communications device.

BACKGROUND

A non-public network (non-public network, NPN) is a network that is being discussed in the 3rd generation partnership project (3rd generation partnership project, 3GPP). Different from a conventional cellular network, the NPN allows access of only some users with specific rights. Two NPN deployment modes are defined in 3GPP: a standalone non-public network (Standalone non-public network, SNPN) and a non-standalone non-public network (non-standalone NPN). The non-standalone NPN is also referred to as a public network integrated NPN (Public Network Integrated NPN, PNI-NPN).

A terminal device moves between an NPN and a public land mobile network (public land mobile network, PLMN). After the terminal device moves from a source network to a target network, the target network establishes a session resource for the terminal device. However, a service delay is caused due to a process of establishing the session resource. Therefore, how to reduce a delay caused by reestablishing a session resource when the terminal device moves across networks becomes an urgent problem to be resolved.

SUMMARY

This application provides an inter-network mobility method and apparatus, and a communications device, so that when a terminal device moves across networks, a configuration of the terminal device in a network can be quickly restored, to reduce complexity and a delay.

According to a first aspect, an inter-network mobility method is provided. The method may be performed by an access device or a module (for example, a chip) configured in the access device. Descriptions are provided below by using an example in which the method is performed by the access device.

The method includes: A first access device establishes a connection to a terminal device, where the first access device is an access device in a first network. The first access device sends a first indication to the terminal device, where the first indication is used to indicate the terminal device to reserve first information after the terminal device moves from the first network to a network other than the first network, and the first information includes one or more of the following information: a context of the terminal device in the first network, information about a signaling radio bearer SRB in the first network, information about a data radio bearer DRB in the first network, an identifier of the terminal device in the first network, information about a first cell in which the first access device provides a service for the terminal device, an identifier of the first network, a cause value, and an address of an N3IWF connected to the terminal device in the first network.

According to the solution of this application, the access device indicates the terminal device to reserve information in the network after the terminal device moves to the network other than the network, so that after moving back to the network, the terminal device can assist, based on the reserved information, in restoring a configuration of the terminal device in the network, to avoid repeated configuration of the information, and reduce complexity and a delay. In addition, after the terminal device moves to the network other than the network, if the terminal device needs to access the network service through the newly accessed network other than the network, procedures such as authentication and registration in the network can be avoided again, to reduce complexity and a delay.

Optionally, the first access device sends capability information of the first network to the terminal device.

By way of example but not limitation, the capability information is used to indicate whether a first network device and/or a core network device can reserve one or more of a context and a transmission resource of the terminal device in the first network after the terminal device moves from the first network to the network other than the first network.

With reference to the first aspect, in some implementations of the first aspect, the first indication includes a first status indication, and the first status indication is used to indicate that the terminal device is in an inactive state in the first network after moving from the first network to the network other than the first network.

With reference to the first aspect, in some implementations of the first aspect, the first indication is further used to configure a part or all of the first information for the terminal device.

In an implementation, the first indication is used to configure a part or all of the first information.

In this implementation, in addition to indicating the terminal device to reserve the first information after the terminal device moves to the network other than the first network, the first indication is further used to indicate a part or all of the first information that needs to be updated, so that the terminal device stores updated information. For example, after the terminal device moves to the network other than the first network, an identifier of the terminal device in the first network is reallocated to the terminal device. In this case, the first indication indicates the updated identifier of the terminal device in the first network. This application is not limited thereto.

In another implementation, the first indication is used to configure each piece of information in the first information.

In this implementation, the first indication is used to configure each piece of information that needs to be reserved by the terminal device, and the terminal device does not need to reserve information that is not configured. To be specific, the terminal device determines, based on each piece of information configured by using the first indication, the information that needs to be reserved.

By way of example but not limitation, the first indication is carried in a radio resource control (radio resource control RRC) release (RRC release) message, an RRC reconfiguration (RRC reconfiguration) message, an RRC setup (RRC setup) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, a mobility from NR command (mobility from NR command) message, or a paging (paging) message sent by the first access device to the terminal device.

With reference to the first aspect, in some implementations of the first aspect, the method further includes:

The first access device receives a second indication sent by the terminal device, where the second indication includes information about a second network to which the terminal device is to move, and the second network is a network other than the first network.

That the first access device sends a first indication to the terminal device includes:

The first access device sends the first indication to the terminal device according to the second indication.

In an implementation, the information that is about the second network to which the terminal device is to move and that is included in the second indication is whether the terminal device moves to the network other than the first network.

By way of example but not limitation, the second indication includes a first reserved field, and the first reserved field is used to indicate whether the terminal device moves to the network other than the first network.

In another implementation, the information that is about the second network to which the terminal device is to move and that is included in the second indication includes but is not limited to one or more of the following:

an identifier of the second network, information about a cell in the second network to which the terminal device is to move, an address of an N3IWF connected to the second network, a cause value, and a value of a first timer.

By way of example but not limitation, identification information of the second network is one of the following identifiers: a PLMN identifier (that is, a PLMN ID), a network identifier (network identifier, NID), a closed access group (closed access group, CAG) identifier, a human-readablenetwork name (Human-readable network name) corresponding to each CAG, or a human-readablenetwork name (Human-readable network name) corresponding to each NID.

By way of example but not limitation, the information about the cell in the second network to which the terminal device is to move includes one or more of identification information of the cell, a tracking area code (tracing area code, TAC) corresponding to the cell, and a radio access network area code (RAN area code, RANAC) corresponding to the cell. The identification information of the cell may be a cell global identifier (cell global identifier, CGI), a physical cell identifier (physical cell identifier, PCI), or a cell identifier (cell identifier).

By way of example but not limitation, the PCI is a network-specific PCI.

In other words, the PCI may be a specific PCI value dedicated to or reserved for a network. For example, a specific PCI value is reserved for an NPN, so that a user can identify, after reading a PCI of a cell, that a network to which the cell belongs is the NPN. Therefore, the UE does not need to further read another identifier (for example, the PLMN ID, the CAG ID, the NID, or the readable network name) that is of the network and that is broadcast in system information to determine a type of the network to which the cell belongs.

According to the solution of this application, the terminal device may learn, as soon as possible based on the PCI, whether a target cell and a currently connected cell belong to a same network, so that the terminal device learns whether intra-network movement or inter-network mobility is performed subsequently and whether to send a second indication to a currently accessed access network device subsequently, or determines whether to reserve a context in a source network or reports the PCI to the connected access network device and the access network device determines whether to perform an operation such as automatic neighbor relation (automatic neighbor relation, ANR). Using PCIs in different value ranges between different networks also helps eliminate interference between network cells.

By way of example but not limitation, the address of the N3IWF may be an IP address of the N3IWF.

The cause value (cause value) is used to indicate a reason why the terminal device sends the second indication.

By way of example but not limitation, a value of the cause value is used to indicate that the reason why the terminal device sends the second indication is one of inter-network mobility, inter-network handover, and inter-network cell reselection.

By way of example but not limitation, the value of the first timer is used to indicate a time interval at which the terminal device moves to the second network.

By way of example but not limitation, the second indication is carried in one of a handover notification (handover notification) message, a proximity indication (proximity indication) message, a measurement report (measurement report) message, an automatic neighbor relation (automatic neighbor relation, ANR)-related message, a location measurement indication (Location measurement indication) message, an RRC system information request (RRC system information request) message, a UE assistance information (UE assistance information) message, a UE capability information (UE capability information) message, an uplink information transfer (UL information transfer) message, an RRC setup request (RRC setup request) message, an RRC resume request (RRC resume request) message, or an RRC reestablishment request (RRC reestablishment request) message.

Optionally, the terminal device sends the second indication to the first access device when the terminal device is about to move.

In this solution, regardless of whether the terminal device moves to the network other than the first network, the terminal device sends the second indication to the first access device when the terminal device is about to move. The first access device determines, based on one or more of the identifier of the second network, the information about the cell in the second network to which the terminal device is to move, and the cause value that are in the received second indication, whether the terminal device moves to the network other than the first network.

Optionally, the terminal device sends the second indication to the first access device only when the terminal device is to move to the network other than the first network.

By way of example but not limitation, the second indication is used to indicate whether the terminal device maintains an inactive state in the first network after the terminal device moves to the second network.

In this solution, the terminal device independently determines whether to maintain the inactive state in the first network. If the terminal device determines to maintain the inactive state in the first network, the terminal device reserves information that needs to be reserved in the inactive state, and notifies, by using the second indication, the first access device that the terminal device enters the inactive state. After receiving the second indication, the first access device determines that the terminal device enters the inactive state and reserves corresponding information. Therefore, the terminal device and the first access device reach a consensus on a status of the terminal device in the first network, so that the terminal device can quickly restore a configuration of the terminal device in the first network after returning to the first network.

With reference to the first aspect, in some implementations of the first aspect, the method further includes:

The first access device determines that the terminal device is to move to the network other than the first network.

The first access device stores second information of the terminal device, where the second information includes one or more of the following information:

a context of the terminal device in the first network, information about a signaling radio bearer SRB in the first network, information about a data radio bearer DRB in the first network, PDU session resource configuration information in the first network, quality of service flow resource configuration information in the first network, an identifier of the terminal device in the first network, information about a first cell in which the first access device provides a service for the terminal device, an identifier of the first network, a cause value, and an address of an N3IWF connected to the terminal device in the first network.

According to the solution of this application, the access device reserves information of the terminal device in the network, so that after the terminal device moves back to the network, the access device can assist, based on the reserved information, in restoring a configuration of the terminal device in the network, to avoid repeated configuration of the information, and reduce complexity and a delay. In addition, after the terminal device moves to the network other than the network, if the terminal device needs to access the network service through a newly accessed network other than the network, procedures such as authentication and registration in the network can be avoided again, to reduce complexity and a delay.

With reference to the first aspect, in some implementations of the first aspect, the method further includes:

The first access device sends a third indication to a core network device in the first network, where the third indication is used to indicate the core network device to reserve one or more of the following information:

a context of the terminal device in the first network, PDU session resource configuration information of the terminal device in the first network, and quality of service flow resource configuration information of the terminal device in the first network.

By way of example but not limitation, the third indication includes one or more identifiers of one or more PDU session resources.

By way of example but not limitation, the third indication includes one or more identifiers of one or more quality of service flows.

With reference to the first aspect, in some implementations of the first aspect, the third indication includes a second status indication, and the second status indication is used to indicate that the terminal device is in an inactive state in the first network.

By way of example but not limitation, the third indication is carried in an NG interface message between the core network device and the first access device.

By way of example but not limitation, the third indication is carried in non-access stratum (Non-Access Stratum, NAS) information that is sent by the terminal device to the core network device and that is forwarded by the first access device.

According to the solution of this application, the core network device reserves information of the terminal device in the network, so that after the terminal device moves back to the network, the core network device can assist, based on the reserved information, in restoring a configuration of the terminal device in the network, to avoid repeated configuration of the information, and reduce complexity and a delay.

With reference to the first aspect, in some implementations of the first aspect, the method further includes:

The first access device receives a fourth indication sent by the terminal device, where the fourth indication includes the part or all of the first information, and the fourth indication is information sent by the terminal device to the first access device after the terminal device moves back from a third network to the first network, where the third network is a network other than the first network.

With reference to the first aspect, in some implementations of the first aspect, the first access device is an access device that last provides a service for the terminal device in the first network before the terminal device moves back to the first network.

With reference to the first aspect, in some implementations of the first aspect, the method further includes:

The first access device sends a fifth indication to the core network device, so that the core network device restores a configuration of the terminal device in the first network, where the fifth indication includes one or more of the following information:

an identifier of the terminal device in the first network, information about a first cell in which the first access device provides a service for the terminal device, an identifier of the first network, a cause value, an address of an N3IWF connected to the terminal device in the first network, and information about a second cell in which the first access device provides a service for the terminal device.

With reference to the first aspect, in some implementations of the first aspect, the method further includes:

The first access device receives a sixth indication sent by a second access device, where the sixth indication is used to request the first access device to provide the second access device with a part or all of the second information.

With reference to the first aspect, in some implementations of the first aspect, the first access device sends the second information to the second access device, so that the second access device restores the configuration of the terminal device in the first network.

According to the solution of this application, the second access device exchanges terminal device-related information with the first access device, so that the second access device obtains information about the terminal device in the first network, and further restores the configuration of the terminal device in the network, to avoid repeated configuration, and reduce complexity and a delay.

With reference to the first aspect, in some implementations of the first aspect, the first access device receives a seventh indication sent by the core network device, where the seventh indication includes one or more of the following information:

information about a cell in the first access device connected to the terminal device, information about the first access device, information about a cell in the second access device connected to the terminal device, information about the second access device, an identifier of the first network, a cause value, and an address of an N3IWF connected to the terminal device in the first network.

With reference to the first aspect, in some implementations of the first aspect, the first network is a public land mobile network PLMN or a non-public network NPN.

According to a second aspect, an inter-network mobility method is provided. The method may be performed by an access device or a module (for example, a chip) configured in the access device. Descriptions are provided below by using an example in which the method is performed by the access device.

The method includes: A second access device receives a fourth indication sent by a terminal device, where the second access device is an access device in a first network, the fourth indication is sent by the terminal device to the second access device after the terminal device moves from a network other than the first network to the first network, and the fourth indication is used to indicate one or more of the following information:

a context of the terminal device in the first network, information about a signaling radio bearer SRB of the terminal device in the first network, information about a data radio bearer DRB of the terminal device in the first network, an identifier of the terminal device in the first network, information about a first cell in which a first access device that provides a service for the terminal device in the first network provides a service for the terminal device, an identifier of the first network, a cause value, and an address of an N3IWF connected to the terminal device in the first network.

The second access device determines the first access device according to the fourth indication, where the first access device is an access device that has served the terminal device in the first network.

With reference to the second aspect, in some implementations of the second aspect, the method further includes:

The first access device sends a third indication to a core network device in the first network, where the third indication is used to indicate the core network device to reserve one or more of the following information:

a context of the terminal device in the first network, PDU session resource configuration information of the terminal device in the first network, and quality of service flow resource configuration information of the terminal device in the first network.

With reference to the second aspect, in some implementations of the second aspect, the third indication includes a second status indication, and the second status indication is used to indicate that the terminal device is in an inactive state in the first network.

With reference to the second aspect, in some implementations of the second aspect, the method further includes:

The first access device receives a fourth indication sent by the terminal device, where the fourth indication includes a part or all of the first information, and the fourth indication is information sent by the terminal device to the first access device after the terminal device moves back from a third network to the first network, where the third network is a network other than the first network.

With reference to the second aspect, in some implementations of the second aspect, the first access device is an access device that last provides a service for the terminal device in the first network before the terminal device moves back to the first network.

With reference to the second aspect, in some implementations of the second aspect, the method further includes:

The first access device sends a fifth indication to the core network device, so that the core network device restores a configuration of the terminal device in the first network, where the fifth indication includes one or more of the following information:

an identifier of the terminal device in the first network, information about a first cell in which the first access device provides a service for the terminal device, an identifier of the first network, a cause value, an address of an N3IWF connected to the terminal device in the first network, and information about a second cell in which the first access device provides a service for the terminal device.

By way of example but not limitation, the fifth indication is carried in NAS information that is sent by the terminal device to the core network device and that is forwarded by the second access device.

By way of example but not limitation, the fifth indication is carried in a path switch request (path switch request) message.

With reference to the second aspect, in some implementations of the second aspect, the method further includes:

The first access device receives a sixth indication sent by the second access device, where the sixth indication is used to request the first access device to provide the second access device with a part or all of second information.

By way of example but not limitation, the sixth indication is carried in retrieve UE context request (retrieve UE context request) signaling sent by the second access device to the first access device.

With reference to the second aspect, in some implementations of the second aspect, the first access device sends the second information to the second access device, so that the second access device restores a configuration of the terminal device in the first network.

With reference to the second aspect, in some implementations of the second aspect, the second access device receives a seventh indication sent by the core network device, where the seventh indication includes one or more of the following information:

information about a cell in the first access device connected to the terminal device, information about the first access device, information about a cell in the second access device connected to the terminal device, information about the second access device, an identifier of the first network, a cause value, and an address of an N3IWF connected to the terminal device in the first network.

With reference to the second aspect, in some implementations of the second aspect, the first network is a public land mobile network PLMN or a non-public network NPN.

According to a third aspect, an inter-network mobility method is provided. The method may be performed by a terminal device or a module (for example, a chip) configured in the terminal device. Descriptions are provided by using an example in which the method is performed by the terminal device.

The method includes: The terminal device establishes a connection to a first access device, where the first access device is an access device in a first network.

The terminal device receives a first indication sent by the first access device, where the first indication is used to indicate the terminal device to reserve first information, and the first information includes one or more of the following information:

a context of the terminal device in the first network, information about a signaling radio bearer SRB in the first network, information about a data radio bearer DRB in the first network, an identifier of the terminal device in the first network, information about a first cell in which the first access device provides a service for the terminal device, an identifier of the first network, a cause value, and an address of an N3IWF connected to the terminal device in the first network.

Optionally, the terminal device receives capability information that is of the first network and that is sent by a core network device.

By way of example but not limitation, the capability information is used to indicate whether the first access device and/or the core network device in the first network can reserve one or more of a context and a transmission resource of the terminal device in the first network after the terminal device connected to the first network moves from the first network to a network other than the first network.

By way of example but not limitation, the capability information is carried in a NAS message.

By way of example but not limitation, the capability information is information that is sent by the core network device and that is forwarded by the first network device to the terminal device.

According to the solution of this application, the core network device in the network connected to the terminal device sends the capability information of the network to the terminal device. When the core network device and/or an access network device can reserve information about the terminal device in the network and reserve/reserves the information about the terminal device in the network after the terminal device moves to a network other than the network, after the terminal device moves back from the network other than the network to the network, the core network device and/or the access network device can assist, based on the reserved information, in restoring a transmission resource of the terminal device in the network, to avoid repeated configuration, and reduce complexity and a delay. In addition, after the terminal device moves to the network other than the network, if the terminal device needs to access the network service through a newly accessed network other than the network, procedures such as authentication and registration in the network can be avoided again, to reduce complexity and a delay.

Optionally, the terminal device sends the capability information of the first network to the core network device.

By way of example but not limitation, the capability information is used to indicate whether the terminal device can reserve one or more of a context and a transmission resource in the first network.

With reference to the third aspect, in some implementations of the third aspect, the first indication includes a first status indication, and the first status indication is used to indicate that the terminal device is in an inactive state in the first network after moving from the first network to a network other than the first network.

With reference to the third aspect, in some implementations of the third aspect, the first indication is further used to configure a part or all of the first information for the terminal device.

With reference to the third aspect, in some implementations of the third aspect, the method further includes:

The terminal device sends a second indication to the first access device, where the second indication includes information about a second network to which the terminal device is to move, and the second network is a network other than the first network.

That the terminal device receives a first indication sent by the first access device includes:

The terminal device receives, according to the second indication, the first indication sent by the first access device.

With reference to the third aspect, in some implementations of the third aspect, the method further includes:

The terminal device moves back from a third network to the first network, where the third network is a network other than the first network.

The terminal device sends a fourth indication to the second access device in the first network, where the fourth indication includes the part or all of the first information.

With reference to the third aspect, in some implementations of the third aspect, the first access device is an access device that last provides a service for the terminal device in the first network before the terminal device moves back to the first network.

With reference to the third aspect, in some implementations of the third aspect, the first access device and the second access device are a same access device in the first network.

With reference to the third aspect, in some implementations of the third aspect, the first network is a public land mobile network PLMN or a non-public network NPN.

According to a fourth aspect, a communications apparatus is provided, and includes modules or units configured to perform the method according to any one of the first aspect or the second aspect and the possible implementations of the first aspect or the second aspect.

According to a fifth aspect, a communications apparatus is provided, and includes a processor. The processor is coupled to a memory, and may be configured to execute instructions in the memory, to implement the method according to any one of the first aspect or the second aspect and the possible implementations of the first aspect or the second aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip configured in the terminal device. When the communications apparatus is the chip configured in the terminal device, the communications interface may be an input/output interface.

Optionally, the transceiver may be a transceiver circuit. Optionally, the input/output interface may be an input/output circuit.

According to a sixth aspect, a communications apparatus is provided, and includes modules or units configured to perform the method according to any one of the third aspect and the possible implementations of the third aspect.

According to a seventh aspect, a communications apparatus is provided, and includes a processor. The processor is coupled to a memory, and may be configured to execute instructions in the memory, to implement the method according to any one of the third aspect and the possible implementations of the third aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip configured in the network device. When the communications apparatus is the chip configured in the network device, the communications interface may be an input/output interface.

Optionally, the transceiver may be a transceiver circuit. Optionally, the input/output interface may be an input/output circuit.

According to an eighth aspect, a processor is provided, and includes an input circuit, an output circuit, and a processing circuit. The processing circuit is configured to: receive a signal through the input circuit, and transmit a signal through the output circuit, so that the processor performs the method according to any one of the first aspect to the third aspect and the possible implementations of the first aspect to the third aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a ninth aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the third aspect and the possible implementations of the first aspect to the third aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the ninth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a tenth aspect, a computer program product is provided. The computer program product includes a computer program (also referred to as code or instructions). When the computer program is run, a computer is enabled to perform the method according to any one of the first aspect to the third aspect and the possible implementations of the first aspect to the third aspect.

According to an eleventh aspect, a computer-readable medium is provided. The computer-readable medium stores a computer program (also referred to as code or instructions). When the computer program is run on a computer, the computer is enabled to perform the method according to any one of the first aspect to the third aspect and the possible implementations of the first aspect to the third aspect.

According to a twelfth aspect, a communications system is provided, including the first access device, the second access device, the core network device, and the terminal device.

DESCRIPTION OF EMBODIMENTS

Figure 1:
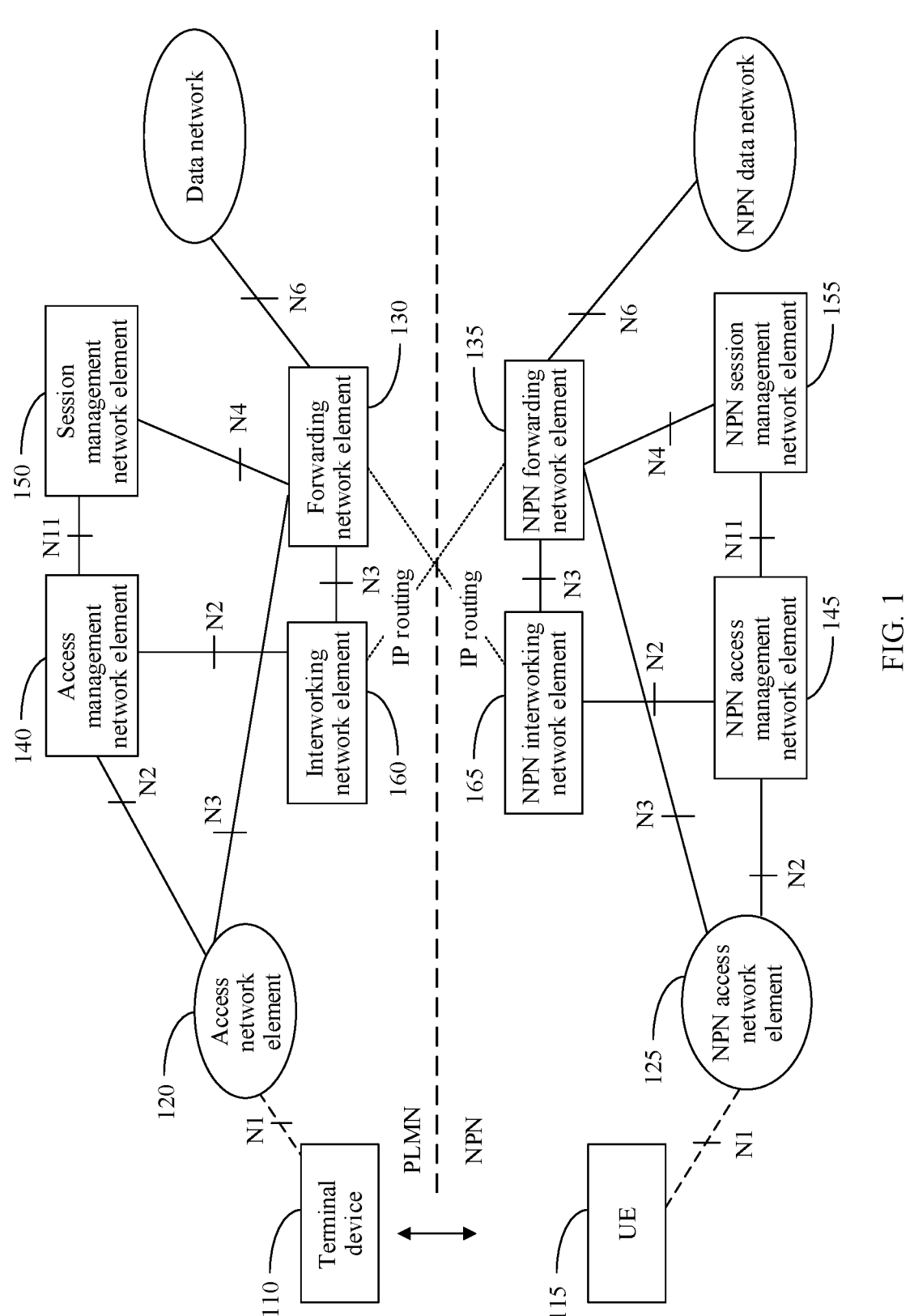
FIG. 1 shows a network architecture applicable to an embodiment of this application.

The following describes technical solutions of this application with reference to the accompanying drawings.

Terms such as "component", "module", and "system" used in this application are used to indicate a computer-related entity, hardware, firmware, a combination of hardware and software, software, or software being executed. For example, the component may be but is not limited to a process that runs on a processor, a processor, an object, an executable file, an execution thread, a program, and/or a computer. As shown in the figures, both a computing device and an application that runs on the computing device may be components. One or more components may reside in a process and/or an execution thread, and a component may be located on one computer and/or distributed between two or more computers. In addition, these components may be executed by various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

The technical solutions of embodiments of this application may be applied to various communications systems, for example, a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, and a future 5th generation (5th Generation, 5G) system or a new radio (New Radio, NR) system.

Usually, a conventional communications system supports a limited quantity of connections, and is also easy to be implemented. However, with development of communications technologies, a mobile communications system not only supports conventional communication, but also supports, for example, device-to-device (Device-to-Device, D2D) communication, machine-to-machine (Machine-to-Machine, M2M) communication, machine type communication (Machine Type Communication, MTC), and vehicle-to-everything (Vehicle-To-Everything, V2X) communication such as vehicle-to-vehicle (Vehicle-to-Vehicle, V2V) communication, vehicle-to-infrastructure (Vehicle-to-Infrastructure, V2I) communication, vehicle-to-pedestrian (Vehicle-to-Pedestrian, V2P) communication, and vehicle-to-network (Vehicle-to-Network, V2N) communication.

FIG. 1 shows a network architecture used in an embodiment of this application. Network elements that may be used in the network architecture are separately described.

A communications system in this application may include at least two networks, for example, a public land mobile network (public land mobile network, PLMN) and a non-public network (non-public network, NPN). It should be noted that in this application, the PLMN and the NPN are used as examples for description, but this application is not limited thereto. Embodiments of this application may be applied to any at least two different networks.

The PLMN may include the following network elements.

1. Terminal device 110: The terminal device 110 may include various handheld devices, vehicle-mounted devices, wearable devices, computing devices that have a wireless communication function, or other processing devices connected to a wireless modem, and various forms of terminals, for example, a mobile station (mobile station, MS), a terminal (terminal), user equipment (user equipment, UE), and a soft client. For example, the terminal device 110 may be a water meter, an electricity meter, or a sensor.

2. (Radio) access network (radio access network, (R)AN) network element 120: The (R)AN network element 120 is configured to provide a network access function for authorized terminal devices in a specific area, and can use transmission tunnels with different quality based on levels of the terminal devices, service requirements, and the like.

The (R)AN network element can manage radio resources and provide an access service for a terminal device, to forward a control signal and terminal device data between the terminal device and a core network. The (R)AN network element may also be understood as a base station in a conventional network.

It should be noted that, the "network element" may also be referred to as an entity, a device, an apparatus, a module, or the like. This is not particularly limited in this application. In addition, in this application, for ease of understanding and description, the description of the "network element" is omitted in some descriptions. For example, a (R)AN network element is briefly referred to as a RAN. In this case, the "(R)AN network element" should be understood as a (R)AN network element or a (R)AN entity. Same or similar cases are not described below.

3. Forwarding network element 130: The forwarding network element 130 is used for packet routing and forwarding, quality of service (quality of service, QoS) processing of user plane data, and the like.

In a 5G communications system, the user plane network element may be a user plane function (user plane function, UPF) network element. In a future communications system, the user plane network element may still be the UPF network element, or may have another name. This is not limited in this application.

4. Data network element: The data network element is configured to provide a network for data transmission.

In a 5G communications system, the data network element may be a data network (data network, DN) element. In a future communications system, the data network element may still be the DN element, or may have another name. This is not limited in this application.

5. Access management network element 140: The access management network element 140 is mainly configured to perform mobility management, access management, and the like, and may be configured to implement functions, for example, lawful interception and access authorization/authentication, other than session management in functions of a mobility management entity (mobility management entity, MME).

In a 5G communications system, the access management network element may be an access and mobility management function (access and mobility management function, AMF) network element. In a future communications system, the access management network element may still be the AMF network element, or may have another name. This is not limited in this application.

6. Session management network element 150: The session management network element 150 is mainly configured to: manage a session, assign and manage an internet protocol (internet protocol, IP) address of a terminal device, select an endpoint that can manage a user plane function interface and a policy control and charging function interface, notify downlink data, and the like.

In a 5G communications system, the session management network element may be a session management function (session management function, SMF) network element. In a future communications system, the session management network element may still be the SMF network element, or may have another name. This is not limited in this application.

7. Policy control network element: The policy control network element is configured to provide guidance on a unified policy framework for network behavior, provide policy rule information for a control plane function network element (for example, an AMF or SMF network element), and the like.

In a 4G communications system, the policy control network element may be a policy and charging rules function (policy and charging rules function, PCRF) network element. In a 5G communications system, the policy control network element may be a policy control function (policy control function, PCF) network element. In a future communications system, the policy control network element may still be the PCF network element, or may have another name. This is not limited in this application.

8. Binding support network element: The binding support network element is configured to search for a PCF associated with a session.

In a 5G communications system, the binding support network element may be a binding support function (binding support function, BSF) network element. In s future communications system, the binding support network element may still be the BSF network element, or may have another name. This is not limited in this application.

9. Authentication server: The authentication server is configured to: perform service authentication, generate a key to implement bidirectional authentication on a terminal device, and support a unified authentication framework.

In a 5G communications system, the authentication server may be an authentication server function (authentication server function, AUSF) network element. In a future communications system, the authentication server function network element may still be the AUSF network element, or may have another name. This is not limited in this application.

10. Data management network element: The data management network element is configured to: process a terminal device identifier, perform access authentication, registration, mobility management, and the like.

In a 5G communications system, the data management network element may be a unified data management (unified data management, UDM) network element. In a future communications system, the unified data management may still be the UDM network element, or may have another name. This is not limited in this application.

11. Application network element: The application network element is configured to perform application-affected data routing, access a network exposure function network element, interact with a policy framework to perform policy control, and the like.

In a 5G communications system, the application network element may be an application function (application function, AF) network element. In a future communications system, the application network element may still be the AF network element, or may have another name. This is not limited in this application.

12. Network storage network element: The network storage network element is configured to maintain real-time information of all network function services in a network.

In a 5G communications system, the network storage network element may be a network repositoryfunction (network repository function, NRF) network element. In a future communications system, the network storage network element may still be the NRF network element, or may have another name. This is not limited in this application.

13. Interworking network element 160: The interworking network element 160 is configured to be responsible for a terminal device in a network outside a PLMN to access a service through the PLMN. In other words, the interworking network element may be an interface network element that is in the PLMN and that is oriented toward another network.

In a 5G communications system, the interworking network element may alternatively be a non-3GPP interworking function (Non-3GPP interworking function, N3IWF) network element.

The NPN may include the following network elements.

14. Terminal device 115: The terminal device 115 may include various handheld devices, vehicle-mounted devices, wearable devices, and computing devices that have a wireless communication function, or other processing devices connected to a wireless modem, and various forms of terminals, for example, a mobile station (mobile station, MS), a terminal (terminal), user equipment (user equipment, UE), and a soft client. For example, the terminal device 115 may be a water meter, an electricity meter, or a sensor. The terminal device 115 and the terminal device 110 may be a same terminal device, that is, the terminal device 115 is a device that can access both the PLMN and the NPN. Alternatively, the terminal device 115 and the terminal device 110 may be different terminal devices, that is, the terminal device 115 can access only the NPN.

15. NPN (radio) access network (NPN radio access network, NPN-(R)AN) network element 125: The NPN-(R)AN network element 125 is configured to provide a network access function for authorized terminal devices in a specific area, and can use transmission tunnels with different quality based on levels of the terminal devices, service requirements, and the like.

The NPN-(R)AN network element can manage radio resources and provide an access service for a terminal device, to forward a control signal and terminal device data between the terminal device and a core network of the NPN. The NPN-(R)AN network element may also be understood as a base station or an access point in the NPN.

16. Forwarding network element 135: The forwarding network element 135 is used for packet routing and forwarding, quality of service (quality of service, QoS) processing of user plane data, and the like.

In the NPN, the user plane network element may be an NPN user plane function (NPN user plane function, NPN-UPF) network element. In a future communications system, the user plane network element may still be the UPF network element, or may have another name. This is not limited in this application.

17. NPN data network element: The NPN data network element is configured to provide a network for data transmission.

In the NPN, the data network element may be an NPN data network (NPN data network, NPN-DN) element. In a future communications system, the data network element may still be the DN element, or may have another name. This is not limited in this application.

18. NPN access management network element 145: The NPN access management network element 145 is mainly configured to perform mobility management, access management, and the like, and may be configured to implement functions, for example, lawful interception and access authorization/authentication, other than session management in functions of a mobility management entity (NPN mobility management entity, NPN-MME).

In the NPN, the access management network element may be an NPN access and mobility management function (NPN access and mobility management function, NPN-AMF) network element. In a future communications system, the access management network element may still be the AMF network element, or may have another name. This is not limited in this application.

19. NPN session management network element 155: The NPN session management network element 155 is mainly configured to: manage a session, assign and manage an internet protocol (internet protocol, IP) address of a terminal device, select an endpoint that can manage a user plane function interface and a policy control and charging function interface, notify downlink data, and the like.

In the NPN, the session management network element may be an NPN session management function (NPN session management function, NPN-SMF) network element. In a future communications system, the session management network element may still be the SMF network element, or may have another name. This is not limited in this application.

20. NPN policy control network element: The NPN policy control network element is configured to: provide guidance on a unified policy framework for network behavior, provide policy rule information for a control plane function network element (for example, an NPN-AMF or NPN-SMF network element), and the like.

In the NPN, the policy control network element may be an NPN policy and charging rules function (NPN policy and charging rules function, NPN-PCRF) network element. Alternatively, the policy control network element may be a policy control function (NPN policy control function, NPN-PCF) network element. In a future communications system, the policy control network element may still be the PCF network element, or may have another name. This is not limited in this application.

21. NPN binding support network element: The NPN binding support network element is configured to search for a PCF associated with a session.

In the NPN, the binding support network element may be an NPN binding support function (NPN binding support function, NPN-BSF) network element. In a future communications system, the binding support network element may still be the BSF network element, or may have another name. This is not limited in this application.

22. NPN authentication server: The NPN authentication server is configured to: perform service authentication, generate a key to implement bidirectional authentication on a terminal device, and support a unified authentication framework.

In the NPN, the authentication server may be an NPN authentication server function (NPN authentication server function, NPN-AUSF) network element. In a future communications system, the authentication server function network element may still be the AUSF network element, or may have another name. This is not limited in this application.

23. NPN data management network element: The NPN data management network element is configured to: process a terminal device identifier, perform access authentication, registration, and mobility management, and the like.

In the NPN, the data management network element may be an NPN unified data management (NPN unified data management, NPN-UDM) network element. In a future communications system, the unified data management may still be the UDM network element, or may have another name. This is not limited in this application.

24. NPN application network element: The NPN application network element is configured to: perform application-affected data routing, access a network exposure function network element, interact with a policy framework to perform policy control, and the like.

In the NPN, the application network element may be an NPN application function (NPN application function, NPN-AF) network element. In a future communications system, the application network element may still be the AF network element, or may have another name. This is not limited in this application.

25. NPN network storage network element: The NPN network storage network element is configured to maintain real-time information of all network function services in a network.

In the NPN, the network storage network element may be an NPN network repository function (NPN network repository function, NPN-NRF) network element. In a future communications system, the network storage network element may still be the NRF network element, or may have another name. This is not limited in this application.

26. NPN interworking network element 165: The NPN interworking network element 165 is configured to be responsible for a terminal device in a network outside the NPN to access a service through the NPN. In other words, the interworking network element may be an interface network element that is in the NPN and that is oriented toward another network.

In the NPN, the interworking network element may alternatively be an NPN non-3GPP interworking function (NPN Non-3GPP interworking function, NPN-N3IWF) network element.

A communication link, for example, a communication tunnel or an IP routing link, exists between the forwarding network element 130 and the NPN interworking network element 165, and a communication link, for example, a communication tunnel or an IP routing link, exists between the NPN forwarding network element 135 and the interworking network element 160.

In other words, in the communications system 100, the terminal device 110 may access a service through the PLMN by using the RAN 120 and the forwarding network element 130.

In addition, the terminal device 110 may access a service through the NPN by using the RAN 120, the forwarding network element 130, the NPN interworking network element 165, and the NPN forwarding network element 135.

In addition, in the communications system 100, the terminal device 115 may access a service through the NPN by using the NPN RAN 125 and the NPN forwarding network element 135.

In addition, the terminal device 115 may access a service through the PLMN by using the NPN RAN 125, the NPN forwarding network element 135, the interworking network element 160, and the forwarding network element 130.

It should be noted that, the "network element" may also be referred to as an entity, a device, an apparatus, a module, or the like. This is not particularly limited in this application. In addition, in this application, for ease of understanding and description, the description of the "network element" is omitted in some descriptions. For example, an AMF network element is briefly referred to as an AMF. In this case, the "AMF" should be understood as an AMF network element or an AMF entity. Same or similar cases are not described below.

It may be understood that the foregoing network element or function may be a network element in a hardware device, a software function running on dedicated hardware, or a virtualized function instantiated on a platform (for example, a cloud platform).

It should be understood that the foregoing network architecture applied to embodiments of this application is merely an example of a network architecture described from a perspective of a service architecture, and the network architecture applicable to embodiments of this application is not limited thereto. Any network architecture that can implement functions of the foregoing network elements is applicable to embodiments of this application.

For example, in some network architectures, network function entities such as an AMF, an SMF, a PCF, and a UDM are all referred to as network function (Network Function, NF) network elements. Alternatively, in some other network architectures, a set of network elements such as an AMF, an SMF, a PCF, a GMF, and a UDM may be referred to as a control plane function (Control Plane Function, CPF) network element.

Embodiments of this application are described with reference to a terminal device. The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STATION, ST) in a WLAN, or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set top box (set top box, STB), customer premises equipment (customer premises equipment, CPE), another device configured to perform communication in a wireless system, a terminal device in a next generation communications system such as a 5G network, a terminal device in a future evolved PLMN, or the like.

By way of example but not limitation, the terminal device in embodiments of this application may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the terminal device may alternatively be a terminal device in an internet of things (Internet of Things, IoT) system. The IoT is an important part of future development of information technologies. A main technical feature of the IoT is to connect a thing to a network by using a communications technology, to implement an intelligent network for human-computer interconnection and thing-thing interconnection.

In this application, each access network device may include one or more antennas. In addition, the access network device may further include a transmitter chain and a receiver chain. A person of ordinary skill in the art can understand that the transmitter chain and the receiver chain each may include a plurality of components (for example, a processor, a modulator, a multiplexer, a demodulator, a demultiplexer, or an antenna) related to signal sending and receiving.

Each access network device may communicate with a plurality of terminal devices.

The terminal device may be, for example, a cellular phone, a smartphone, a portable computer, a handheld communications device, a handheld computing device, a satellite radio apparatus, a global positioning system, a PDA, and/or any other proper device used for communication in a wireless communications system.

The access network device may send data or information to the terminal device through a forward link (also referred to as a downlink), and receive data or information from the terminal device through a reverse link (also referred to as an uplink).

For example, in a frequency division duplex (Frequency Division Duplex, FDD) system, the forward link and the reverse link may use different frequency bands.

For another example, in a time division duplex (Time Division Duplex, TDD) system and a full duplex (Full Duplex) system, the forward link and the reverse link may use a same frequency band.

Each antenna (or antenna group including a plurality of antennas) and/or each area designed for communication are/is referred to as a sector of the access network device.

For example, an antenna group may be designed to communicate with a terminal device in a sector within a coverage area of the access network device. The access network device may send signals to all terminal devices in a corresponding sector by using a single antenna or a multi-antenna transmit diversity.

In a process in which the access network device communicates with the terminal device through the forward link, a transmit antenna of the access network device may improve a signal-to-noise ratio of the forward link through beamforming.

In addition, compared with a manner in which the access network device sends the signals to all the terminal devices of the access network device by using the single antenna or the multi-antenna transmit diversity, in a manner in which the access network device sends, through beamforming, signals to terminal devices that are randomly scattered in a related coverage area, interference to a mobile device in a neighboring cell is less.

At a given time, the access network device or the terminal device may be a wireless communications sending apparatus and/or a wireless communications receiving apparatus. During data sending, the wireless communications sending apparatus may encode data for transmission. Specifically, the wireless communications sending apparatus may obtain (for example, generate, receive from another communications apparatus, or store in a memory) a specific quantity of data bits to be sent to the wireless communications receiving apparatus through a channel. The data bits may be included in a transport block (or a plurality of transport blocks) of data, and the transport block may be segmented to generate a plurality of code blocks.

In addition, the communications system 100 may further include a D2D network, an M2M network, an IoT network, a V2X network, or another network. FIG. 1 is only a simplified schematic diagram of an example. The network may further include another access network device or a network element in another mobile network, which is not shown in FIG. 1.

In embodiments of this application, the terminal device or the forwarding device includes a hardware layer, an operating system layer running on the hardware layer, and an application layer running on the operating system layer. The hardware layer includes hardware such as a central processing unit (Central Processing Unit, CPU), a memory management unit (Memory Management Unit, MMU), and a memory (also referred to as a main memory). An operating system may be any one or more computer operating systems that implement service processing by using a process (process), for example, a Linux operating system, a Unix operating system, an Android operating system, an iOS operating system, or a windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a terminal device or a network device, or a functional module that is in the terminal device or the network device and that can invoke and execute the program.

In addition, aspects or features in embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (Compact Disc, CD) or a digital versatile disc (Digital Versatile Disc, DVD)), a smart card, and a flash memory component (for example, an erasable programmable read-only memory (Erasable Programmable Read-Only Memory, EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

It should be noted that in embodiments of this application, a plurality of application programs may be run at the application layer. In this case, an application program for performing the method in embodiments of this application and an application program used to control a receive end device to implement an action corresponding to received data may be different application programs.

In addition, to facilitate understanding of embodiments of this application, the following descriptions are provided.

First, in this application, "used to indicate" may include "used to directly indicate" and "used to indirectly indicate". When indication information is described as being used to indicate A, the indication information may be used to directly indicate A or used to indirectly indicate A, but it does not necessarily mean that the indication information includes A.

Information used for indication may be referred to as to-be-indicated information. In a specific implementation process, the to-be-indicated information may be indicated in a plurality of manners. For example, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or agreed on in advance. For example, specific information may alternatively be indicated by using an arrangement sequence of all information that is agreed on in advance (for example, stipulated in a protocol), to reduce indication overheads to some extent. In addition, a common part of all information may be further identified and indicated in a unified manner, to reduce indication overheads caused by separately indicating same information. When a plurality of pieces of information of a same type need to be indicated, indication manners of different information may be different. In a specific implementation process, a required indication manner may be selected based on a specific requirement. The selected indication manner is not limited in embodiments of this application. In this way, the indication manner in embodiments of this application should be understood as covering various methods that can enable a to-be-indicated party to learn of the to-be-indicated information.

The to-be-indicated information may be sent as a whole, or may be divided into a plurality of pieces of sub-information for separate sending. In addition, sending periodicities and/or sending occasions of the sub-information may be the same or different. A specific sending method is not limited in this application. The sending periodicities and/or the sending occasions of the sub-information may be predefined, for example, predefined according to a protocol, or may be configured by a transmit end device by sending configuration information to a receive end device. For example, the configuration information may include but is not limited to one or a combination of at least two of radio resource control signaling, MAC layer signaling, and physical layer signaling. The radio resource control signaling includes, for example, RRC signaling. The MAC layer signaling includes, for example, a MAC control element (control element, CE). The physical layer signaling includes, for example, downlink control information (downlink control information, DCI).

Second, the terms "first", "second", and various numbers in the following embodiments are merely used for differentiation for ease of description, and are not used to limit the scope of embodiments of this application. For example, the terms are used to distinguish between different preset correspondences.

Third, in the following embodiments, "preset" may include "indicated by a network device by using signaling or "predefined", for example, "defined in a protocol". Herein, "predefined" may be implemented in a manner in which corresponding code, a table, or other related indication information is pre-stored in a device (for example, including user equipment and a network device). A specific implementation thereof is not limited in this application.

Fourth, "store" in embodiments of this application may be "stored in one or more memories". The one or more memories may be separately disposed, or may be integrated into an encoder, a decoder, a processor, or a communications apparatus. Alternatively, some of the one or more memories may be separately disposed, and some of the one or more memories are integrated into an encoder, a decoder, a processor, or a communications apparatus. A type of the memory may be a storage medium in any form. This is not limited in this application.

Fifth, a "protocol" in embodiments of this application may be a standard protocol in the communications field, for example, may include an LTE protocol, an NR protocol, and a related protocol applied to a future communications system. This is not limited in this application.

Sixth, a network device mentioned in this application may include but is not limited to an access device and a core network device. Steps performed by the network device may be performed by any network element in the access network device, the core network device, or the network device. This is not limited in this application.

The solutions provided in this application are applicable to a process in which a terminal device moves or is handed over between two networks. For example, the solutions provided in this application are applicable to a scenario in which UE moves from a PLMN (that is, an example of a first network) to an NPN (that is, an example of a network other than a first network) and then moves back to the PLMN and accesses the PLMN, or the solutions provided in this application are applicable to a scenario in which UE moves from an NPN (that is, another example of a first network) to a PLMN (that is, another example of a network other than a first network) and then moves back to the NPN and accesses the NPN.

Figure 2A:
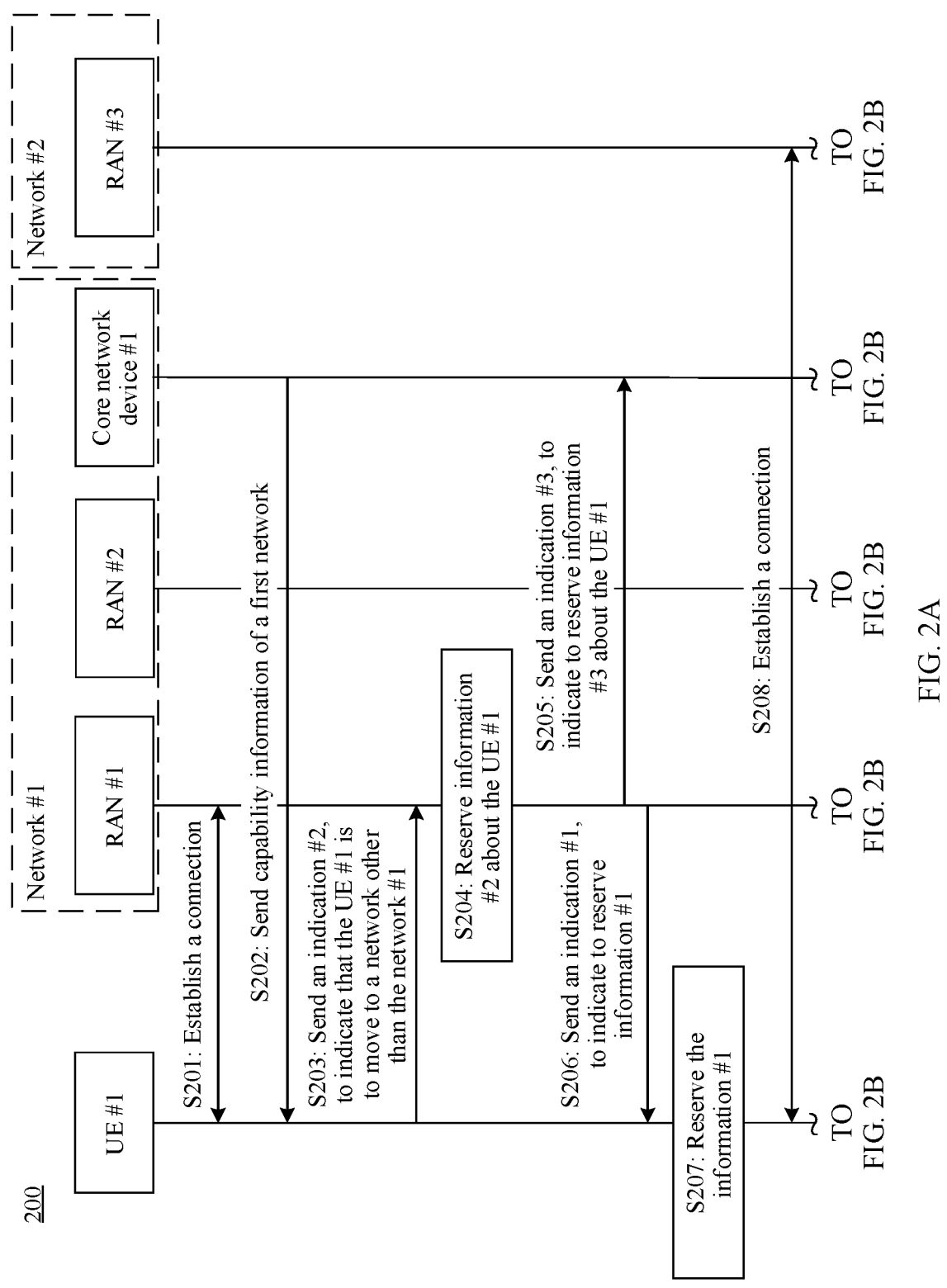
FIG. 2A and FIG. 2B are an example flowchart of an inter-network mobility method according to an embodiment of this application.
Figure 2B:
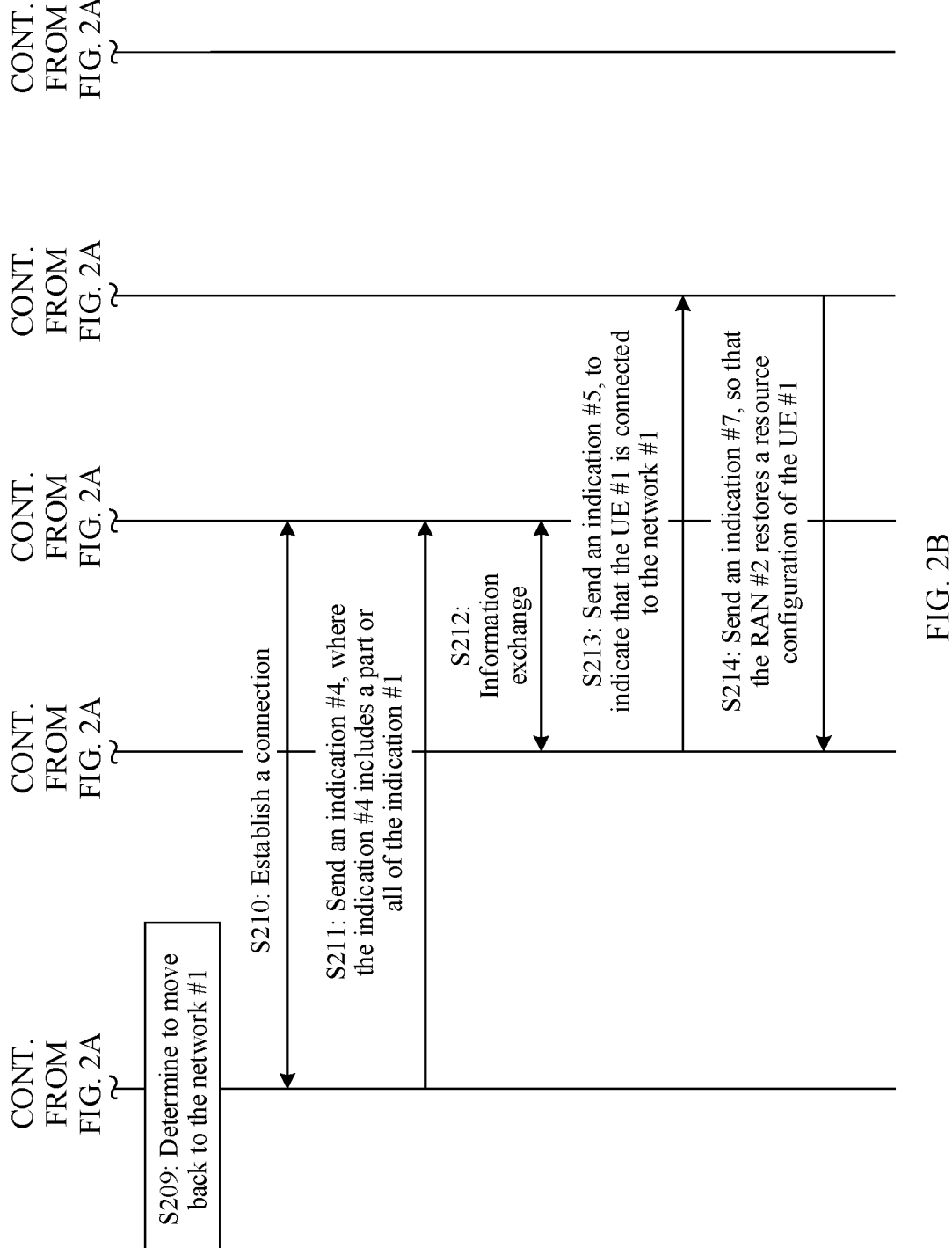

FIG. 2A and FIG. 2B are an example flowchart of an inter-network mobility method according to an embodiment of this application.

FIG. 2A and FIG. 2B show two networks: a network #1 (that is, another example of a first network) and a network #2 (that is, another example of a network other than the first network). The network #1 includes an access device RAN #1 (that is, an example of a first access device) and an access device RAN #2 (that is, an example of a second access device), and the network #1 further includes a core network device #1 (that is, an example of a core network device in the first network). The network #2 includes an access device RAN #3. The solution of this application is described in detail below by using an example in which UE #1 (that is, an example of a terminal device) moves from the network #1 to the network #2 and then moves back to the network #1.

S201: The UE #1 establishes a connection to the RAN #1.

S202: The core network device #1 sends capability information of the network #1 to the UE #1.

The UE #1 establishes the connection to the RAN #1, that is, the UE #1 registers with the network #1, and the UE #1 and the core network device #1 in the network #1 establish a protocol data unit (protocol data unit, PDU) session resource. Optionally, the UE #1 may alternatively establish a PDU session resource between the UE #1 and a core network device 2 in a second network by using a network element in the core network device #1, for example, a UPF in the core network device #1, an N3IWF network element that connects the first network and the second network, and an IPSec tunnel between the network element in the core network device #1 and the N3IWF network element.

In S202, the core network device #1 sends the capability information of the network #1 to the UE #1. By way of example but not limitation, the capability information may indicate whether the RAN #1 and/or the core network device #1 in the network #1 can reserve one or more of a context and a transmission resource of the terminal device in the network #1 after the terminal device connected to the network #1 moves from the network #1 to a network other than the network #1.

Optionally, the core network device #1 may directly send the capability information of the network #1 to the UE #1, for example, by using a NAS message. Alternatively, the core network device #1 may first send the capability information of the network #1 to the RAN #1, and then the RAN #1 forwards the capability information of the network #1 to the UE #1.

Optionally, the RAN #1 may alternatively send the capability information of the network #1 to the UE #1. By way of example but not limitation, the capability information may indicate whether the RAN #1 and/or the core network device #1 in the network #1 can reserve one or more of a context and a transmission resource of the terminal device in the network #1 after the terminal device connected to the network #1 moves from the network #1 to a network other than the network #1.

Optionally, the UE #1 may alternatively send the capability information of the UE #1 to the RAN #1 and/or the core network device #1. By way of example but not limitation, the capability information may indicate whether the UE #1 can reserve one or more of a context and a transmission resource in the network #1 after the UE #1 moves from the network #1 to a network other than the network #1.

Optionally, the capability information in S202 may be carried in an RRC release (RRC release) message, an RRC reconfiguration (RRC reconfiguration) message, an RRC setup (RRC setup) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, a mobility from NR command (mobility from NR command) message, a paging (paging) message, or the like.

According to the solution of this application, the core network device in the network connected to the terminal device sends the capability information of the network to the terminal device. When the core network device and/or an access network device can reserve one or more of a context and a transmission resource of the terminal device in the network after the terminal device moves from the network to a network other than the network, after receiving the capability information, the terminal device determines that after the terminal device moves from the network to the network other than the network, the core network device and/or the access network device can reserve one or more of the context and the transmission resource of the terminal device. When the core network device and/or the access network device reserve/reserves one or more of the context and the transmission resource of the terminal device, after the terminal device moves back from the network other than the network to the network, the core network device and/or the access network device can assist, based on the reserved information, in restoring the transmission resource of the terminal device in the network, to avoid repeated configuration, and reduce complexity and a delay. In addition, after the terminal device moves to the network other than the network, if the terminal device needs to access the network service through a newly accessed network other than the network, procedures such as authentication and registration in the network can be avoided again, to reduce complexity and a delay.

By way of example but not limitation, the transmission resource of the terminal device in the network #1 may be one or more of a PDU session resource, information about a time period for which the transmission resource can be maintained (for example, a keeping alive timer (Keeping alive timer)), a signaling radio bearer SRB, a data radio bearer DRB, a quality of service flow resource, an identifier of the UE #1 in the network #1, and an address of an N3IWF connected to the UE #1 in the network #1. The context information and/or the transmission resource of the terminal device in the network #1 may alternatively be one or more of a context, configuration information, and an IPSec tunnel resource in the network #1 that are related to the network #2 and that are used when the terminal device establishes a PDU session resource between the terminal device and the core network device #2 in the second network by using a network element in a core network, an N3IWF, and an IPSec tunnel.

S203: The UE #1 sends an indication #2 (that is, an example of a second indication) to the RAN #1, to indicate that the UE #1 is to move to a network other than the network #1.

Optionally, the indication #2 is carried in one of a handover notification (handover notification) message, a proximity indication (proximity indication) message, a measurement report (measurement report) message, an automatic neighbor relation (automatic neighbor relation, ANR)-related message, a location measurement indication (Location measurement indication) message, an RRC system information request (RRC system information request) message, a UE assistance information (UE assistance information) message, a UE capability information (UE capability information) message, an uplink information transfer (UL information transfer) message, an RRC setup request (RRC setup request) message, an RRC resume request (RRC resume request) message, or an RRC reestablishment request (RRC reestablishment request) message.

S204: The RAN #1 reserves information #2 (that is, an example of second information) about the UE #1.

S205: The RAN #1 sends an indication #3 (that is, an example of a third indication) to the core network device #1, to indicate the core network device to reserve information #3.

S206: The RAN #1 sends an indication #1 (that is, an example of a first indication) to the UE #1, to indicate the UE #1 to reserve information #1 (that is, an example of first information).

Optionally, the indication #1 in S206 may be carried in an RRC release (RRC release) message, an RRC reconfiguration (RRC reconfiguration) message, an RRC setup (RRC setup) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, a mobility from NR command (mobility from NR command) message, a paging (paging) message, or the like.

S207: The UE #1 determines the reserved information #1 according to the indication #1.

In S203, the UE #1 sends the indication #2 to the RAN #1, where the indication #2 is used to indicate information about a target network to which the UE #1 is to move.

In an implementation, the information about the target network to which the UE #1 is to move may be whether the UE #1 moves to a network other than the network #1.

By way of example but not limitation, the indication #2 includes a reserved field #1. The reserved field #1 is used to indicate whether the UE #1 moves to the network other than the network #1. For example, the reserved field #1 is a 1-bit indication. When the 1-bit indication is set to "0", it indicates that the UE #1 moves between devices in the network #1 or the UE #1 does not move. When the 1-bit indication is set to "1", it indicates that the UE #1 moves to the network other than the network #1. Alternatively, when the 1-bit indication is set to "1", it indicates that the UE #1 moves between devices in the network #1 or the UE #1 does not move. When the 1-bit indication is set to "0", it indicates that the UE #1 moves to the network other than the network #1.

In this embodiment, the UE #1 moves to the network other than the network #1, that is, moves to the network #2. For example, when the reserved field #1 in the indication #2 sent by the UE #1 to the RAN #1 is set to "0", it indicates that the UE #1 moves to the network other than the network #1.

In another implementation, the information about the target network to which the UE #1 is to move may include but is not limited to one or more of the following information a to e.

a. Identification Information of the Target Network

By way of example but not limitation, the identification information of the target network may be but is not limited to one of the following identifiers: a PLMN identifier (that is, a PLMN ID), a network identifier (network identifier, NID), a closed access group (closed access group, CAG) identifier, a human-readablenetwork name (Human-readable network name) corresponding to each CAG, or a human-readablenetwork name (Human-readable network name) corresponding to each NID.

In this embodiment, the target network to which the UE #1 is to move is the network #2. Therefore, an identifier of the network #2 may be one of the foregoing identification information of the network.

The identification information of the network may be broadcast by a cell in a corresponding network to the terminal device in system information. For example, the PLMN ID, the CAG ID, and the NID are broadcast in a system information block type 1 (system information block type 1, SIB 1), and the human-readable network name is broadcast to the UE in a SIB 2, system information above the SIB 2, or other dedicated system information, or may be sent to the UE by using an RRC message, for example, an RRC setup (RRC setup) message, an RRC reconfiguration (RRC reconfiguration) message, an RRC release (RRC release) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, or a mobility from NR command (mobility from NR command) message, or a paging (paging) message. Sending the human-readable network name in the RRC message can resolve a problem that the terminal device cannot obtain the human-readable network name because the system information to which the human-readable network name belongs is not broadcast in the network cell, a problem that the UE further needs to initiate an on-demand request to obtain the system information when the system information to which the human-readable network name belongs is not broadcast in the network cell, a problem that even if the system information to which the human-readable network name belongs is broadcast, the UE needs to independently search for the system information to read the human-readable network name, and a problem that broadcast information cannot be received on a spectrum resource on which the UE is located, to save time and reduce a delay, so that the UE subsequently performs manual selection or automatic selection to access the cell in the corresponding network.

b. Information about a Cell in the Target Network

By way of example but not limitation, the information about the cell may include but is not limited to one or more of an identifier of the cell, a tracking area code (tracing area code, TAC) corresponding to the cell, and a radio access network area code (RAN area code, RANAC) corresponding to the cell. The identifier of the cell may be a CGI, a physical cell identifier (physical cell identifier, PCI), or a cell identifier (cell identifier).

The PCI is determined based on a sequence of a primary synchronization signal (primary synchronization signal, PSS) and a secondary synchronization signal (secondary synchronization signal, SSS), so that the UE can identify a cell by using the PSS/SSS. A PCI may be reserved, to enable the terminal device to identify, based on the PCI of the cell, a type of a network to which the cell belongs.

By way of example but not limitation, the PCI is a network-specific PCI.

In other words, the PCI may be a specific PCI value dedicated to or reserved for a network. For example, a specific PCI value may be reserved for an NPN, so that a user can identify, after reading a PCI of a cell, that a network to which the cell belongs is the NPN. Therefore, the UE does not need to further read another identifier (for example, the PLMN ID, the CAG ID, the NID, or the readable network name) that is of the network and that is broadcast in system information to determine a type of the network to which the cell belongs. In this way, the terminal device may learn as soon as possible whether a target cell and a currently connected cell belong to a same network, so that the terminal device learns whether intra-network movement or inter-network mobility is performed subsequently and whether to send a second indication to a currently accessed access network device subsequently, or determines whether to reserve a context in a source network or reports the PCI to the connected access network device and the access network device determines whether to perform an operation such as automatic neighbor relation (automatic neighbor relation, ANR) (for example, the access network device identifies, based on the measured PCI reported by the UE, whether a neighboring cell and a cell supported by the access network device belong to a same network and whether inter-cell handover can be supported, to determine whether to further perform ANR). Using PCIs in different value ranges between different networks also helps eliminate interference between network cells. Therefore, PCIs available to networks may be classified. For example but not limited to, different PCI values are classified into three types or three ranges between an NPN and a PLMN: a first type of PCI value: which is used only for a cell in the PLMN;

a second type of PCI value: which is used only for a cell in the NPN; and a third type of PCI value: which is used for a cell shared by the PLMN and the NPN.

Certainly, each type of PCI value may be further divided into more sub-types of PCI values for subdivision. For example but not limited to, the second type of PCI value may be further divided into three sub-types:

a first sub-type of PCI value: which is used only for a cell in a PNI-NPN;

a second sub-type of PCI value: which is used only for a cell in an SNPN; and a third sub-type of PCI value: which is used for a cell shared by the PNI-NPN and the SNPN.

Similarly, for example but not limited to, the third type of PCI value may be further divided into three sub-types:

a first sub-type of PCI value: which is used for a cell shared by the PNI-NPN and the NPN;

a second type of PCI value: which is used for a cell shared by the SNPN and the PLMN; and a third sub-type of PCI value: which is used for a cell shared by the PNI-NPN, the SNPN, and the PLMN.

The classification of the PCI value may be broadcast in cell system information, or may be sent to the UE by using an RRC message. For example, a cell in an SNPN/NPN may send, to the UE by using the system information or the RRC message, a PCI range (or a reserved PCI range) to which the network belongs or PCI ranges to which different networks belong. The system information may be a system information block type 1 (system information block type 1, SIB 1), a SIB 2, system information above the SIB 2, or other dedicated system information. The RRC message may be an RRC release (RRC release) message, an RRC reconfiguration (RRC reconfiguration) message, an RRC setup (RRC setup) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, a mobility from NR command (mobility from NR command) message, a paging (paging) message, or the like.

c. Address of an N3IWF Connected to the Target Network

By way of example but not limitation, the address of the N3IWF may be an IP address of the N3IWF.

d. Cause Value

The cause value (cause value) is used to indicate a reason why the UE #1 sends the indication #2. By way of example but not limitation, a value of the cause value is used to indicate that the reason why the terminal device sends the indication #2 is one of inter-network mobility, inter-network handover, and inter-network cell reselection. For example, when the cause value in the indication #2 sent by the UE #1 indicates "0", it indicates that the terminal device moves across networks.

e. Value of a Timer A

By way of example but not limitation, the value of the timer A is used to indicate a time interval at which the UE #1 moves to the network #2.

After receiving the indication #2 sent by the UE #1, the RAN #1 determines the target network to which the UE #1 is to move.

By way of example but not limitation, the indication #2 may be carried in one of a handover notification (handover notification) message, a proximity indication (proximity indication) message, a measurement report (measurement report) message, an automatic neighbor relation (automatic neighbor relation, ANR)-related message, a location measurement indication (Location measurement indication) message, an RRC system information request (RRC system information request) message, a UE assistance information (UE assistance information) message, a UE capability information (UE capability information) message, an uplink information transfer (UL information transfer) message, an RRC setup request (RRC setup request) message, an RRC resume request (RRC resume request) message, or an RRC reestablishment request (RRC reestablishment request) message.

Optionally, when the terminal device is about to move, the terminal device sends the indication #2 to the access device. In other words, regardless of whether the terminal device moves to the network other than the network #1, the terminal device sends the indication #2 to the access device when the terminal device is about to move. The RAN #1 determines, based on one or more of the identifier of the target network, the information about the cell in the target network to which the UE #1 is to move, and the cause value that are in the received indication #2, whether the UE #1 is to move to the network other than the network #1.

For example, the indication #2 includes the identifier of the target network. After receiving the indication #2 sent by the UE #1, the RAN #1 determines, based on whether the identifier of the target network is the same as an identifier of the network #1, a network to which the UE #1 is to move. When the identifier that is of the target network and that is indicated by the indication #2 is the same as the identifier of the network #1, the RAN #1 determines that the UE #1 moves within the network #1. When the identifier that is of the target network and that is indicated by the indication #2 is different from the identifier of the network #1, the RAN #1 determines that the UE #1 is to move to the network other than the network #1.

For another example, the indication #2 indicates the cause value. When the cause value is "intra-network movement", it indicates that the UE #1 moves within the network #1. When the cause value is "inter-network mobility", it indicates that the UE #1 is move to the network other than the network #1. After receiving the indication #2 sent by the UE #1, the RAN #1 determines, based on the cause value, the network that is other than the network #1 and to which the UE #1 is to move.

Optionally, the terminal device sends the indication #2 to the access device only when the terminal device is to move to the network other than the network #1. To be specific, when the terminal device moves within the network #1, the terminal device does not send the indication #2 to the access device.

For example, the indication #2 is carried in an inter-network mobility dedicated message, for example, an inter-network mobility (inter-network mobility) message. The inter-network mobility message is sent to the RAN #1 only when the UE #1 moves across networks. To be specific, when the UE #1 moves within the network #1, the UE #1 does not send the inter-network mobility message to the RAN #1. After receiving the inter-network mobility message, the RAN #1 determines that the UE #1 is to move to the network other than the network #1.

Optionally, the indication #2 is further used to indicate whether the UE #1 maintains an inactive state of the network #1 after moving to the network #2. In this solution, the UE #1 independently determines whether to maintain the inactive state of the network #1. If the solution is performed, S206 in FIG. 2A is optional. When the UE #1 determines to maintain the inactive state of the network #1 after moving to the network #2, the UE #1 reserves information that needs to be reserved in the inactive state, and sends the indication #2 to the RAN #1 to notify the RAN #1 that the UE #1 maintains the inactive state of the network #1 after moving to the network #2. The information that needs to be reserved in the inactive state is also described below. In this solution, the terminal device determines, based on a subsequent requirement, whether to maintain the inactive state of the network, and notifies the network that the terminal device maintains the inactive state after moving to another network, so that the terminal device and the network device can reach a consensus on a status maintained after the terminal device moves out of the network, and therefore the terminal device can reuse previously reserved information when returning from the another network to the network, to avoid repeated configuration, and reduce complexity and a delay.

After receiving the indication #2, the RAN #1 determines that the UE #1 is to move to the network other than the network #1, and the RAN #1 determines whether the information #2 about the UE #1 needs to be reserved in the network.

Optionally, the RAN #1 determines that the information #2 needs to be reserved. For example, in S204, the RAN #1 reserves the information #2 about the UE #1. The information #2 includes but is not limited to one or more of the following information:

a context of the UE #1 in the network #1, information about a signaling radio bearer SRB in the network #1, information about a data radio bearer DRB in the network #1, PDU session resource configuration information in the network #1, quality of service flow resource configuration information in the network #1, an identifier of the UE #1 in the network #1, information about a cell in which the RAN #1 provides a service for the UE #1, an identifier of the network #1, a cause value, and an address of an N3IWF connected to the UE #1 in the network #1.

According to the solution of this application, the access device reserves information about the terminal device in the network, so that after the terminal device moves back to the network, the core network device can assist, based on the reserved information, in restoring a configuration of the terminal device in the network, to avoid repeated configuration of the information, and reduce complexity and a delay.

Optionally, for example, in S205, the RAN #1 sends the indication #3 to the core network device #1 in the network #1, to indicate the core network device #1 to reserve the information #3 about the UE #1, where the information #3 includes but is not limited to one or more of the following information:

a context of the UE #1 in the network #1, PDU session resource configuration information of the UE #1 in the network #1, and quality of service flow resource configuration information of the UE #1 in the network #1.

By way of example but not limitation, the indication #3 includes one or more identifiers of one or more PDU session resources, and the indication #3 is used to indicate the one or more identifiers of the one or more PDU session resources to notify the core network device #1 to reserve configuration information of the one or more PDU session resources identified by the one or more identifiers of the one or more PDU session resources.

By way of example but not limitation, the indication #3 includes one or more identifiers of one or more quality of service flows, and the indication #3 indicates the one or more identifiers of the one or more quality of service flows to notify the core network device #1 to reserve the one or more quality of service flows identified by the one or more identifiers of the one or more quality of service flows.

By way of example but not limitation, the indication #3 includes a status indication B (that is, an example of a second status indication), and the status indication B is used to indicate that the UE #1 is in an inactive state in the network #1. After receiving the indication #3, the core network device #1 determines that the UE #1 enters the inactive state, and reserves information that needs to be reserved by the UE #1 in the inactive state.

In an implementation, the indication #3 may be information exchanged between the core network device #1 and the RAN #1.

In another implementation, the indication #3 may be NAS information that is sent by the UE #1 to the core network device #1 and that is forwarded by the RAN #1.

According to the solution of this application, the core network device reserves information of the terminal device in the network, so that after the terminal device moves back to the network, the access device can assist, based on the reserved information, in restoring a configuration of the terminal device in the network, to avoid repeated configuration of the information, and reduce complexity and a delay.

In S206, the RAN #1 sends the indication #1 (that is, an example of the first indication) to the UE #1, where the indication #1 is used to indicate the UE #1 to reserve the information #1, and the information #1 includes but is not limited to one or more of the following information:

a context of the UE #1 in the network #1, information about a signaling radio bearer (signaling radio bearer, SRB) of the UE #1 in the network #1, information about a data radio bearer (data radio bearer, DRB) of the UE #1 in the network #1, an identifier of the UE #1 in the network #1, information about a cell in which the RAN #1 provides a service for the UE #1, an identifier of the network #1, a cause value, and an address of an N3IWF connected to the terminal device in the network #1.

The identifier of the UE #1 in the network #1 may be but is not limited to any form of identifier: a 5G S-temporary mobile subscriber identity (5G S-temporary mobile subscriber identity, 5G-S-TMSI), an inactive radio network temporary identity (inactive radio network temporary identity, I-RNTI), a globally unique temporary identity (globally unique temporary identity, GUTI), a subscription concealed identifier (subscription concealed identifier, SUCI), and a temporary mobile subscriber identity (temporary mobile subscriber identity, TMSI).

Specific forms of the information about the cell in which a service is provided for the UE #1, the identifier of the network #1, and the address of the N3IWF connected to the network #1 may be respectively specific forms of the information about the cell in the target network, the identifier of the target network, and the address of the N3IWF connected to the target network in S203. For brevity, details are not described herein again.

In an implementation, the information included in the information #1 is preset in a system or specified in a protocol, and the indication #1 includes a 1-bit indication field used to indicate whether the UE #1 reserves information content corresponding to the information in the information #1. For example, it is specified in a protocol that if information that needs to be stored when the terminal device moves across networks includes a context of the terminal device in the network and an identifier of the terminal device in the network, when the UE #1 receives the 1-bit indication field that is in the indication #1 and that indicates to store the information #1, the UE #1 reserves the context of the UE #1 in the network #1 and the identifier of the UE #1 in the network #1.

In another implementation, the indication #1 includes a status indication A, and the status indication A is used to indicate the UE #1 to maintain an inactive state of the network #1 after the UE #1 moves to the network other than the network #1. If the UE #1 determines, after receiving the indication #1, that the RAN #1 indicates the UE #1 to maintain the inactive state, the UE #1 maintains the inactive state of the network #1 after moving to the network other than the network #1, and reserves information that needs to be reserved in the inactive state, where the information that needs to be reserved in the inactive state is a part or all of the information #1, and the information that needs to be reserved in the inactive state is specified in a protocol or preset on a system.

For example, it is specified in a protocol that if the context of the terminal device in the network, the information about the SRB of the terminal device in the network, the information about the DRB of the terminal device in the network, and the identifier of the terminal device in the network need to be reserved in the inactive state, and the information that needs to be reserved in the inactive state is all of the information #1, the indication #1 only indicates the UE #1 to maintain the inactive state after the UE #1 moves to the network other than the network #1. In this case, after receiving the indication #1, the UE #1 determines to store the context, the information about the SRB, and the information about the DRB in the network #1 after movement.

For another example, it is specified in a protocol that if the context of the terminal device in the network, the information about the SRB of the terminal device in the network, the information about the DRB of the terminal device in the network, and the identifier of the terminal device in the network need to be reserved in the inactive state, and the information #1 includes the context of the terminal device in the network, the information about the SRB of the terminal device in the network, the information about the DRB of the terminal device in the network, the identifier of the terminal device in the network, and the information about the cell in which the RAN #1 provides a service for the UE #1, that is, the information that needs to be reserved in the inactive state is a part of the information #1, the indication #1 indicates the UE #1 to maintain the inactive state after the UE #1 moves to the network other than the network #1, and the indication #1 further indicates the UE #1 to reserve, after the UE #1 moves to the network other than the network #1, the information about the cell in which the RAN #1 provides a service for the UE #1. After receiving the indication #1, the UE #1 determines to maintain the inactive state of the network #1 after movement, reserve the information that needs to be reserved in the inactive state, and further reserve the information that is about the cell in which the RAN #1 provides a service for the UE #1 and that is indicated by the indication #1.

It should be understood that this application is not only applicable to an RRC inactive (RRC inactive) state, in the first network, of the UE and of the terminal device interacting with the network side after they move from the first network to the network other than the first network, but also applicable to one or more of an RRC idle (RRC idle) state, an RRC connected (RRC connected) state, a connection management idle (connection management idle, CM idle) state, and a CM connected (CM connected) state.

Optionally, the indication #1 is further used to configure a part or all of the information #1 for the UE #1.

In an implementation, the indication #1 is used to configure a part or all of the information #1 that needs to be reserved by the UE #1. The indication #1 is used to indicate the information #1 that needs to be reserved, and further configure or reconfigure content that needs to be updated in the information #1 and information in the information #1 that is not reconfigured by using the indication #1. In this case, the UE #1 reserves originally stored content. For example, the information #1 includes a context of the UE #1 in the network #1, information about an SRB of the UE #1 in the network #1, information about a DRB of the UE #1 in the network #1, and an identifier of the UE #1 in the network #1. The indication #1 is used to indicate the information #1 that needs to be reserved, and further reconfigure the identifier of the UE #1 in the network #1 for the UE #1. In this case, after moving to the network #2, the UE #1 reserves the identifier that is in the network #1 and that is reconfigured by using the indication #1, and reserves original configuration content of other information.

In another implementation, the indication #1 is used to configure each piece of content that needs to be reserved in the information #1. The RAN #1 configures or reconfigures, by using the indication #1, the information #1 that needs be reserved by the UE #1. For example, the RAN #1 sends, to the UE #1, four pieces of information: a context of the UE #1 in the network #1, information about an SRB of the UE #1 in the network #1, information about a DRB of the UE #1 in the network #1, an identifier of the UE #1 in the network #1 that are configured or reconfigured by using the indication #1. In other words, the information #1 includes the four pieces of information. The UE #1 reserves the four pieces of information after moving to the network other than the network #1.

By way of example but not limitation, the indication #1 is carried in an RRC release (RRC release) message sent by the RAN #1 to the UE #1.

According to the solution of this application, the network device in the network indicates the terminal device to reserve information in the network, so that after returning from another network to the network, the terminal device can assist, based on the reserved information, in restoring a resource configuration of the terminal device in the network, to avoid repeated configuration, and reduce complexity and a delay. In addition, after the terminal device moves to the network other than the network, if the terminal device needs to access the network service through a newly accessed network other than the network, procedures such as authentication and registration in the network can be avoided again, to reduce complexity and a delay.

S208: The UE #1 moves to the network #2 and establishes a connection to a RAN #3 in the network #2.

S209: The UE #1 determines to move back to the network #1.

In S208, the UE #1 moves from the network #1 to the network #2, and the UE #1 may provide the RAN #3 with information #4 about the UE #1 in the network #1, where the information #4 may include but is not limited to one or more of the following information:

information about a cell connected to the UE #1 in the network #1, information about the RAN #1 serving the UE #1 in the network #1, an identifier of the network #1, a cause value, an address of an N3IWF connected to the UE #1 in the network #1, and an identifier of the UE #1 in the network #1.

A specific form of the information included in the information #4 may be one of specific forms of corresponding information in S203 to S209. For brevity, details are not described again.

By way of example but not limitation, the information #4 is included in an RRC setup request (RRC setup request) message or an RRC resume (RRC resume) message sent by the UE #1 to the RAN #3.

Optionally, after being connected to the RAN #3, the UE #1 may directly or indirectly (for example, through the connected network #2) establish a connection to a network device (for example, a core network device AMF, the access network device #1, or another access network device) in the network #1, to request to establish or restore a transmission resource in the network #1, and the network device (for example, the core network device AMF, the access network device #1, or the another access network device) in the network #1 may quickly establish or restore the connection to the UE #1 based on the reserved context information of the UE #1, transmission resource configuration parameter information, and the like, so that procedures such as authentication and registration in the network #1 can be avoided again, to reduce complexity and a delay.

In S209, the UE #1 determines to move back to the network #1. S209 may include a process of interaction between the UE #1 and the network device in the network in S203 to S207, or may be a movement or handover process in the conventional technology. This is not limited in this application.

S210: The UE #1 moves back to the network #1 and establishes a connection to the RAN #2 (that is, an example of the second access device) in the network #1.

S211: The UE #1 sends an indication #4 to the RAN #2, where the indication #4 indicates a part or all of the information #1.

S212: The RAN #2 exchanges information with the RAN #1.

S213: The RAN #2 sends an indication #5 to the core network device #1, to notify the core network device #1 that the UE #1 is connected to the RAN #2.

S214: The core network device #1 sends an indication #7 to the RAN #2.

After moving back to the network #1, the UE #1 sends the indication #4 to the RAN #2 in the network #1, where the indication #4 is used to indicate the part or all of the information #1, that is, the indication #4 indicates one or more of the following information:

a context of the UE #1 in the network #1, information about a signaling radio bearer (signaling radio bearer, SRB) of the UE #1 in the network #1, information about a data radio bearer (data radio bearer, DRB) of the UE #1 in the network #1, an identifier of the UE #1 in the network #1, information about a cell in which the RAN #1 provides a service for the UE #1, an identifier of the network #1, a cause value, and an address of an N3IWF connected to the terminal device in the network #1.

A specific form of the information indicated by the indication #4 may be one of specific forms of corresponding information in S203 to S209. For brevity, details are not described again.

After receiving the indication #4, the RAN #2 determines that the UE #1 reserves the information in the network #1.

Optionally, S212 in which the RAN #2 exchanges information with the RAN #1 may be specifically as follows: The RAN #2 determines, according to the indication #4, the access device RAN #1 that has established a connection to the UE #1 in the network #1. The RAN #2 sends an indication #6 (that is, an example of a sixth indication) to the RAN #1, where the indication #6 is used by the RAN #2 to request, from the RAN #1, a context and/or PDU session resource configuration information that are/is of the UE #1 and that are/is stored in the RAN #1, that is, a part or all of the information #2. After receiving the request message, the RAN #1 sends the context and/or the PDU session resource configuration information (for example, carried in retrieve UE context response (retrieve UE context response) signaling) of the UE #1 to the RAN #2.

By way of example but not limitation, the indication #6 is carried in retrieve UE context request (retrieve UE context request) signaling sent by the RAN #2 to the RAN #1.

According to the solution of this application, the terminal device that is connected to once connected network again sends the reserved information in the network to the network device in the network, so that the network device in the network can restore a configuration of the terminal device in the network based on the information provided by the terminal device, to avoid repeated configuration, and reduce complexity and a delay.

Optionally, in S213, the RAN #2 sends the indication #5 to the core network device #1, to notify the core network device #1 that the UE #1 is connected to the RAN #2.

By way of example but not limitation, the indication #5 includes one or more of the following information:

information about a cell in the RAN #1 connected to the UE #1, information about the RAN #1, information about a cell in the RAN #2 connected to the UE #1, information about the RAN #2, an identifier of the network #1, a cause value, an address of an N3IWF connected to the UE #1 in the network #1, and an identifier of the UE #1 in the network #1.

A specific form of the information included in the indication #5 may be one of specific forms of corresponding information in S203 to S209. For brevity, details are not described again.

By way of example but not limitation, the cause value is used by the RAN #2 to notify the core network device #1 of a reason for sending the indication #5. For example, the cause value is used to indicate that the UE #1 moves across networks, the cause value is used to indicate that the UE #1 is handed over across networks, or the cause value is used to indicate that the UE #1 performs cell reselection across networks.

By way of example but not limitation, the indication #5 may be NAS information that is sent by the UE #1 to the core network device #1 and that is forwarded by the RAN #2.

By way of example but not limitation, the indication #5 may be information exchanged between the RAN #2 and the core network device #1.

By way of example but not limitation, the indication #5 is carried in a path switch request (path switch request) message.

According to the solution of this application, the core network device in the network receives an indication sent by the access network device and/or the terminal device, to determine that the terminal device moves back to the network and reserves information in the network, so that the core network device can assist in restoring a resource configuration of the terminal device in the network, to avoid repeated configuration, and reduce complexity and a delay.

Optionally, in S214, the core network device #1 sends the indication #7 to the RAN #2, so that the RAN #2 restores a resource configuration of the UE #1, where the indication #7 includes one or more of the following information:

information about a cell in the RAN #1 connected to the UE #1, information about the RAN #1, information about a cell in the RAN #2 connected to the UE #1, information about the RAN #2, an identifier of the network #1, a cause value, and an address of an N3IWF connected to the UE #1 in the network #1.

A specific form of the information included in the indication #7 may be one of specific forms of corresponding information in S203 to S209. For brevity, details are not described again.

Figure 3A:
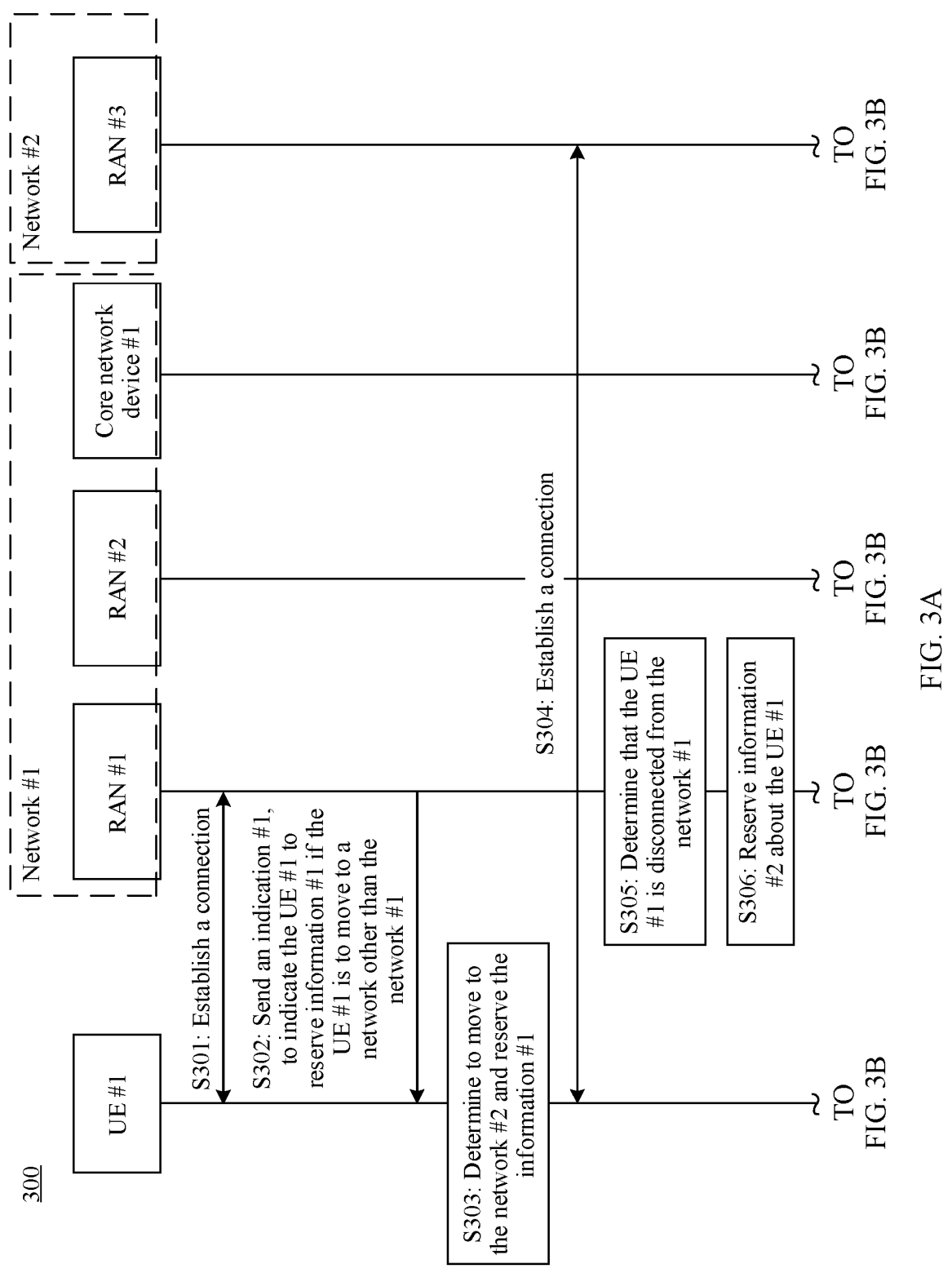
FIG. 3A and FIG. 3B are another example flowchart of an inter-network mobility method according to an embodiment of this application.
Figure 3B:
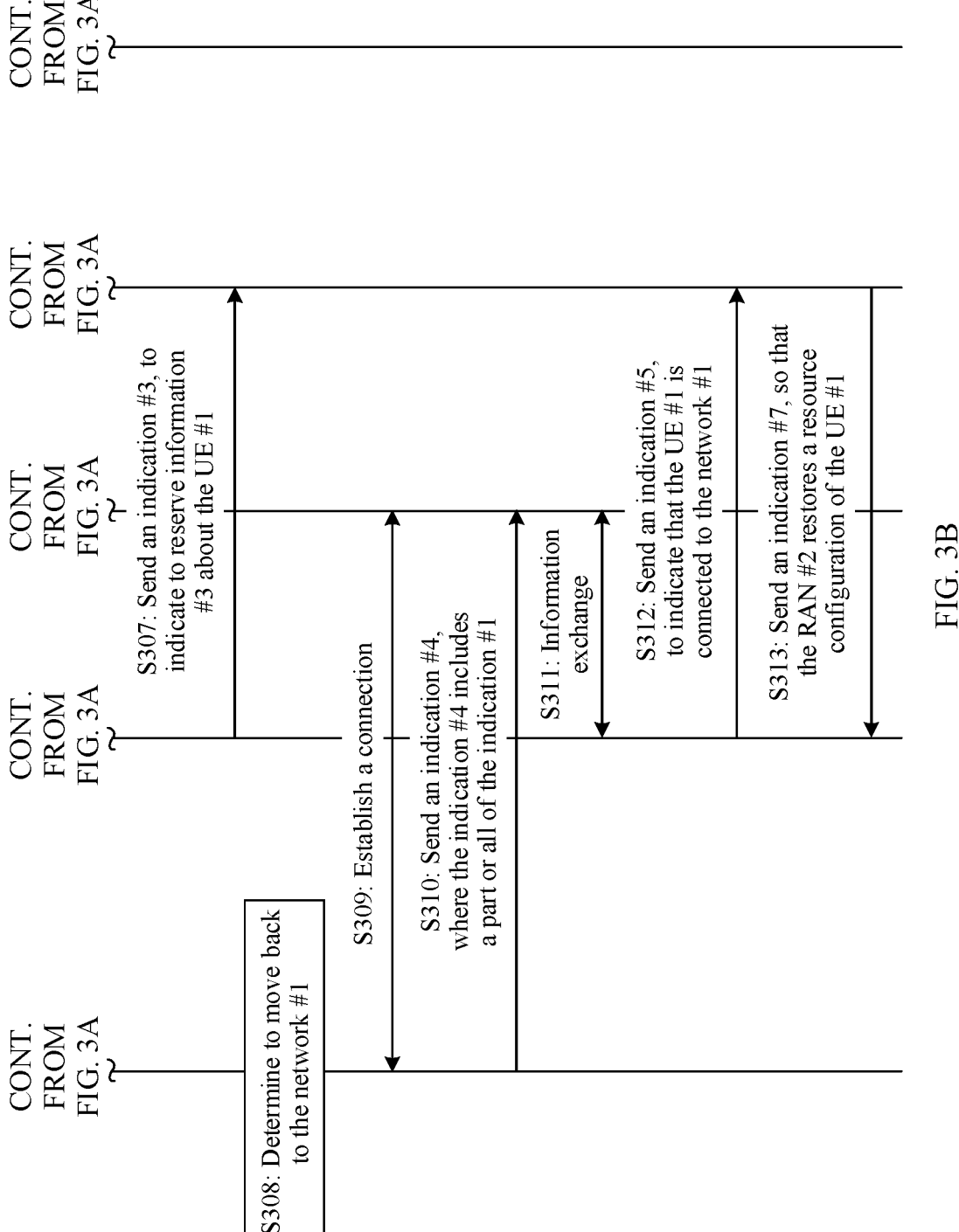

FIG. 3A and FIG. 3B are another example flowchart of an inter-network mobility method according to an embodiment of this application.

S301: UE #1 establishes a connection to a RAN #1.

S302: The RAN #1 sends an indication #1 (that is, an example of a first indication) to the UE #1, to indicate the UE #1 to reserve information #1 (that is, an example of first information) when the UE #1 moves from a network #1 to a network other than the network #1.

S303: The UE #1 determines to move to a network #2 and reserves the information #1.

For example, in S302, after the UE #1 establishes the connection, the RAN #1 sends the indication #1 to the UE #1, where the indication #1 is used to indicate the UE #1 to reserve the information #1 when the UE #1 moves from the network #1 to the network other than the network #1.

By way of example but not limitation, the indication #1 is carried in an RRC reconfiguration (RRC reconfiguration) message, an RRC setup (RRC setup) message, an RRC release (RRC release) message, an RRC resume (RRC resume) message, an RRC reestablishment (RRC reestablishment) message, a security mode command (security mode command) message, a downlink information transfer (DL information transfer) message, a UE capability enquiry (UE capability enquiry) message, a counter check (counter check) message, a mobility from NR command (mobility from NR command) message, or a paging (paging) message sent by the RAN #1 to the UE #1.

In S303, after determining to move to the network #2, the UE #1 reserves the information #1 in the network #1 according to the received indication #1.

In S305, when the RAN #1 determines that the UE #1 is not in the network #1, that is, when the RAN #1 determines that the UE #1 is disconnected from the network #1, or when the RAN #1 determines that the UE #1 moves to another network, the RAN #1 reserves information #2 about the UE #1, and sends an indication #3 to a core network device #1 in S307, to indicate the core network device to reserve information #3 about the UE #1.

According to the solution of this application, after the terminal device accesses a network, a network device in the network indicates the terminal device to reserve information in the network if the terminal device moves across networks to a network other than the network. When the terminal device moves across networks, the terminal device reserves information in a source network according to the indication, so that the network device and the terminal device reach a consensus on whether to reserve the information in the source network after the terminal device moves across networks, and when the terminal device moves back to the source network, the terminal device can assist, based on the reserved information, in restoring a configuration of the terminal device in the network, to avoid repeated configuration, and reduce complexity and a delay. In addition, after the terminal device moves to the network other than the network, if the terminal device needs to access the network service through a newly accessed network other than the network, procedures such as authentication and registration in the network can be avoided again, to reduce complexity and a delay.

It should be noted that for content and processes in the embodiment in FIG. 3A and FIG. 3B that are the same as or similar to those in the embodiment in FIG. 2A and FIG. 2B, refer to the foregoing descriptions in FIG. 2A and FIG. 2B. For brevity, details are not described herein again.

It should be understood that sequence numbers of the processes do not mean execution sequences in the foregoing embodiments. The execution sequences of the processes should be determined based on functions and internal logic of the processes, and should not be construed as any limitation on the implementation processes of embodiments of this application.

The foregoing describes, in detail with reference to FIG. 2A and FIG. 2B and FIG. 3A and FIG. 3B, the methods provided in embodiments of this application. The following describes, in detail with reference to FIG. 4 to FIG. 6, apparatuses provided in embodiments of this application.

Figure 4:
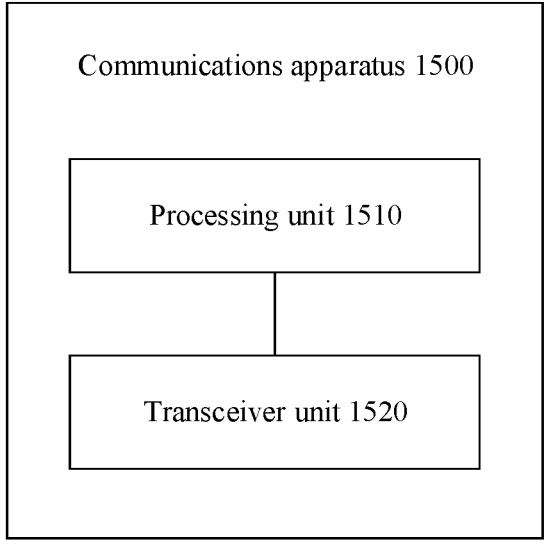
FIG. 4 is a schematic block diagram of an example of a wireless communications apparatus applicable to an embodiment of this application.

FIG. 4 is a schematic block diagram of a communications apparatus according to an embodiment of this application. As shown in FIG. 4, the communications apparatus 1500 may include a processing unit 1510 and a transceiver unit 1520.

In a possible design, the communications apparatus 1500 may correspond to the terminal device in the foregoing method embodiments, for example, may be the terminal device or a chip configured in the terminal device.

It should be understood that the communications apparatus 1500 may correspond to the terminal device in the method 200 and the method 300 according to embodiments of this application. The communications apparatus 1500 may include units configured to perform the method performed by the terminal device in the methods 200 and 300 in FIG. 2A and FIG. 2B and FIG. 3A and FIG. 3B. In addition, the units in the communications apparatus 1500 and the foregoing other operations and/or functions are intended to implement the corresponding procedures of the methods 200 and 300 in FIG. 2A and FIG. 2B and FIG. 3A and FIG. 3B.

When the communications apparatus 1500 is configured to perform the method 200 in FIG. 2A and FIG. 2B, the transceiver unit 1520 may be configured to perform S202, S203, S206, and S211 in the method 200, and the processing unit 1510 is configured to perform S201, S207, S208, S209, and S210 in the method 200. When the communications apparatus 1500 is configured to perform S302 and S310 in the method 300 in FIG. 3A and FIG. 3B, the processing unit 1510 is configured to perform S301, S303, S304, S308, and S309 in the method 300. It should be understood that a specific process in which the units perform the foregoing corresponding steps has been described in detail in the foregoing method embodiments. For brevity, details are not described herein again.

Figure 5:
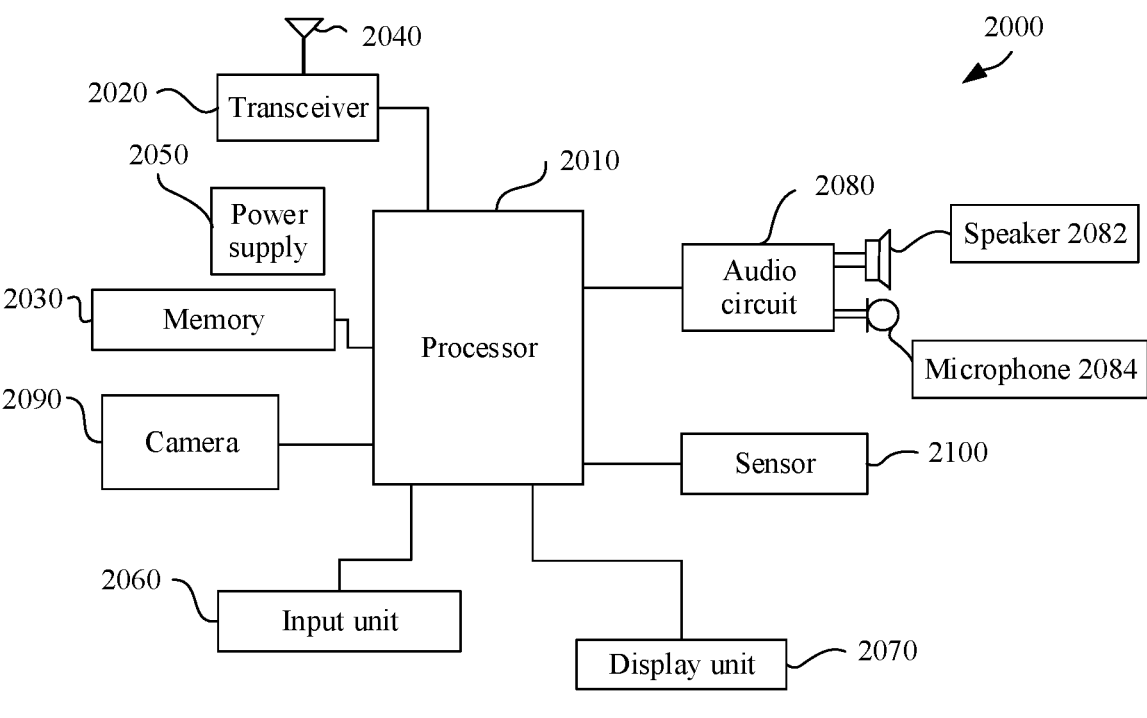
FIG. 5 is a schematic diagram of an example of a structure of a terminal device applicable to an embodiment of this application.

It should be further understood that, when the communications apparatus 1500 is a terminal device, the transceiver unit 1520 in the communications apparatus 1500 may correspond to a transceiver 2020 in a terminal device 2000 shown in FIG. 5, and the processing unit 1510 in the communications apparatus 1500 may correspond to a processor 2010 in the terminal device 2000 shown in FIG. 5.

It should be further understood that, when the communications apparatus 1500 is a terminal device, the transceiver unit 1520 in the communications apparatus 1500 may be implemented through a communications interface (for example, a transceiver or an input/output interface), for example, may correspond to the transceiver 2020 in the terminal device 2000 shown in FIG. 5, and the processing unit 1510 in the communications apparatus 1500 may be implemented by using at least one processor, for example, may correspond to the processor 2010 in the terminal device 2000 shown in FIG. 5.

Optionally, the communications apparatus 1500 may further include the processing unit 1510. The processing unit 1510 may be configured to process instructions or data, to implement a corresponding operation.

Optionally, the communications apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps has been described in detail in the foregoing method embodiments. For brevity, details are not described herein again.

In another possible design, the communications apparatus 1500 may correspond to the access device in the foregoing method embodiments, for example, may be the access device or a chip configured in the access device.

It should be understood that the communications apparatus 1500 may correspond to the access device in the methods 200 and 300 in FIG. 2A and FIG. 2B and FIG. 3A and FIG. 3B according to embodiments of this application. The communications apparatus 1500 may include units configured to perform the method performed by the access device in the methods 200 and 300 in FIG. 2A and FIG. 2B and FIG. 3A and FIG. 3B. In addition, the units in the communications apparatus 1500 and the foregoing other operations and/or functions are intended to implement the corresponding procedures of the methods 200 and 300 in FIG. 2A and FIG. 2B and FIG. 3A and FIG. 3B.

When the communications apparatus 1500 is configured to perform the method 200 in FIG. 2A and FIG. 2B, the transceiver unit 1520 may be configured to perform S203, S205, S206, S212, S213, and S214 in the method 200, and the processing unit 1510 is configured to perform S201 and S204 in the method 200. When the communications apparatus 1500 is configured to perform S302, S307, S311, S312, and S313 in the method 300 in FIG. 3A and FIG. 3B, the processing unit 1510 is configured to perform S301, S305, and S306 in the method 300. It should be understood that a specific process in which the units perform the foregoing corresponding steps has been described in detail in the foregoing method embodiments. For brevity, details are not described herein again.

Figure 6:
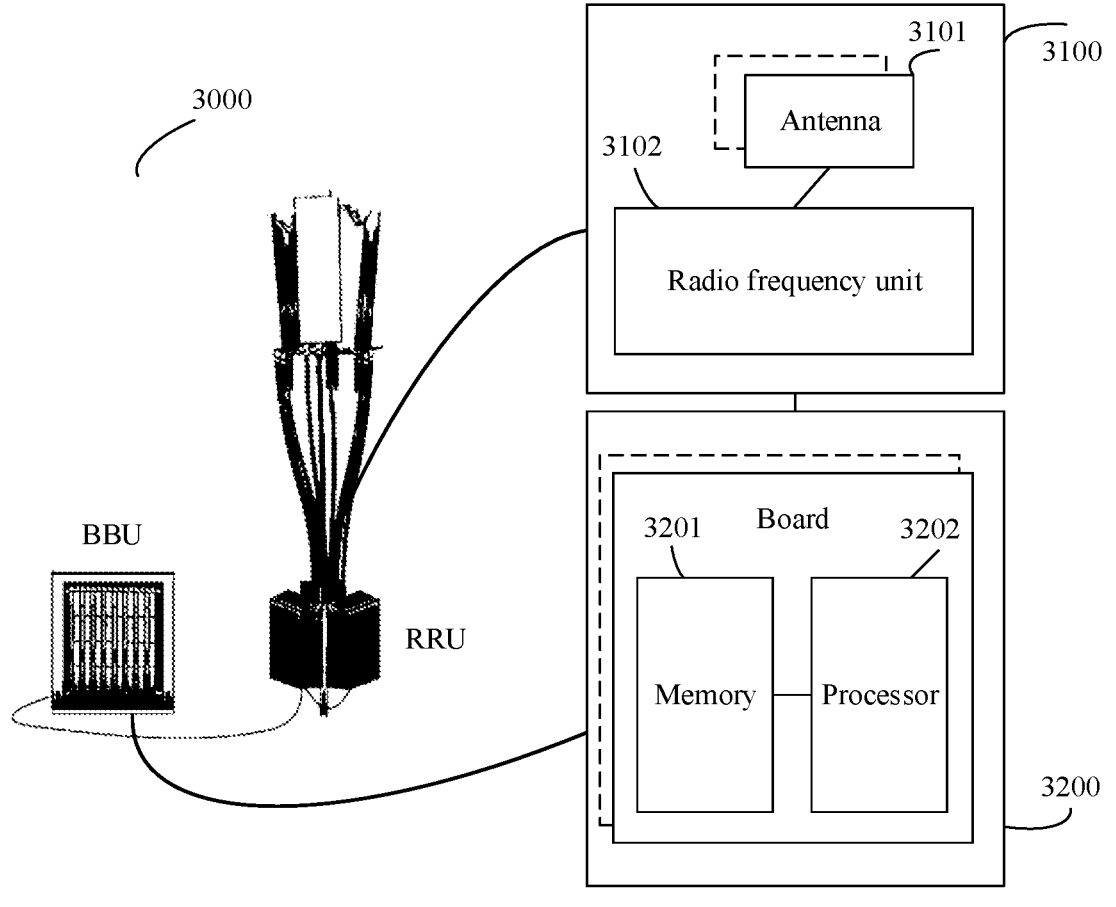
FIG. 6 is a schematic diagram of an example of a structure of an access device applicable to an embodiment of this application.

It should be further understood that, when the communications apparatus 1500 is an access device, the transceiver unit in the communications apparatus 1500 may correspond to a transceiver 3100 in an access device 3000 shown in FIG. 6, and the processing unit 1510 in the communications apparatus 1500 may correspond to a processor 3202 in the access device 3000 shown in FIG. 6.

Optionally, the communications apparatus 1500 may further include the processing unit 1510. The processing unit 1510 may be configured to process instructions or data, to implement a corresponding operation.

Optionally, the communications apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps has been described in detail in the foregoing method embodiments. For brevity, details are not described herein again.

It should be further understood that, when the communications apparatus 1500 is an access device, the transceiver unit 1520 in the communications apparatus 1500 may be implemented through a communications interface (for example, a transceiver or an input/output interface), for example, may correspond to the transceiver 3100 in the access device 3000 shown in FIG. 6, and the processing unit 1510 in the communications apparatus 1500 may be implemented by using at least one processor, for example, may correspond to the processor 3202 in the access device 3000 shown in FIG. 6.

In another possible design, the communications apparatus 1500 may correspond to the core network device in the foregoing method embodiments, for example, may be the core network device or a chip configured in the core network device.

It should be understood that the communications apparatus 1500 may correspond to the core network device in the methods 200 and 300 according to embodiments of this application. The communications apparatus 1500 may include units configured to perform the method performed by the core network device in the methods 200 and 300 in FIG. 2A and FIG. 2B and FIG. 3A and FIG. 3B. In addition, the units in the communications apparatus 1500 and the foregoing other operations and/or functions are intended to implement the corresponding procedures of the methods 200 and 300 in FIG. 2A and FIG. 2B and FIG. 3A and FIG. 3B.

When the communications apparatus 1500 is configured to perform the method 200 in FIG. 2A and FIG. 2B, the transceiver unit 1520 may be configured to perform S202, S205, S213, and S214 in the method 200. The communications apparatus 1500 is configured to perform S307, S312, and S313 in the method 300 in FIG. 3A and FIG. 3B. It should be understood that a specific process in which the units perform the foregoing corresponding steps has been described in detail in the foregoing method embodiments. For brevity, details are not described herein again.

Optionally, the communications apparatus 1500 may further include the processing unit 1510. The processing unit 1510 may be configured to process instructions or data, to implement a corresponding operation.

Optionally, the communications apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps has been described in detail in the foregoing method embodiments. For brevity, details are not described herein again.

It should be further understood that, when the communications apparatus 1500 is a core network device, the transceiver unit 1520 in the communications apparatus 1500 may be implemented through a communications interface (for example, a transceiver or an input/output interface), and the processing unit 1510 in the communications apparatus 1500 may be implemented by using at least one processor.

FIG. 5 is a schematic diagram of a structure of a terminal device 2000 according to an embodiment of this application. The terminal device 2000 may be used in the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. In a specific implementation, the memory 2030 may alternatively be integrated into the processor 2010, or may be independent of the processor 2010. The processor 2010 may correspond to the processing unit in FIG. 4.

The transceiver 2020 may correspond to the transceiver unit in FIG. 4. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 5 can implement each process performed by the terminal device in the method embodiments shown in FIG. 2A and FIG. 2B and FIG. 3A and FIG. 3B. Operations and/or functions of the modules in the terminal device 2000 are intended to implement the corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending to the access device or receiving from the access device that is performed by the terminal device and that is described in the foregoing method embodiments. For details, refer to the descriptions in the foregoing method embodiments. The details are not described herein again.

Optionally, the terminal device 2000 may further include a power supply 2050, configured to supply power to components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 6 is a schematic diagram of a structure of an access device according to an embodiment of this application, for example, may be a schematic diagram of a structure of a base station.

It should be understood that the access device shown in FIG. 6 can implement each process of the access device in the method embodiments shown in FIG. 2A and FIG. 2B and FIG. 3A and FIG. 3B. The operations and/or the functions of the modules in the access device are intended to implement corresponding procedures in the foregoing method embodiment. For details, refer to the descriptions in the foregoing method embodiments. To avoid repetition, detailed descriptions are properly omitted herein.

It should be understood that the access device shown in FIG. 6 is merely a possible architecture of the access device, and should not constitute any limitation on this application. The method provided in this application is applicable to an access device having another architecture, for example, an access device including a CU, a DU, and an AAU. A specific architecture of the access device is not limited in this application.

An embodiment of this application further provides a processing apparatus, including a processor and an interface.

The processor is configured to perform the method in any one of the foregoing method embodiments.

It should be understood that, the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processor unit (central processor unit, CPU), a network processor (network processor, NP), a digital signal processor (digital signal processor, DSP), a micro controller unit (micro controller unit, MCU), a programmable logic device (programmable logic device, PLD), or another integrated chip.

In an implementation process, steps in the foregoing methods can be completed by using a hardware integrated logical circuit in the processor, or by using instructions in a form of software. The steps in the methods disclosed with reference to embodiments of this application may be directly performed and completed by a hardware processor, or may be performed and completed by using a combination of hardware and software modules in a processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include, but not limited to, these memories and any memory of another proper type.

According to the methods provided in embodiments of this application, this application further provides a computer program product. The computer program product includes computer program code. When the computer program code is run on a computer, the computer is enabled to perform the methods in the embodiments shown in FIG. 2A and FIG. 2B and FIG. 3A and FIG. 3B.

According to the methods provided in embodiments of this application, this application further provides a computer-readable medium. The computer-readable medium stores program code. When the program code is run on a computer, the computer is enabled to perform the methods in the embodiments shown in FIG. 2A and FIG. 2B and FIG. 3A and FIG. 3B.

According to the methods provided in embodiments of this application, this application further provides a system. The system includes the foregoing one or more terminal devices and the foregoing one or more access devices.

The access device and the terminal device in the foregoing apparatus embodiments exactly correspond to the access device and the terminal device in the method embodiments. A corresponding module or unit performs a corresponding step. For example, a communications unit (a transceiver) performs a receiving step or a sending step in the method embodiments, and a step other than the sending step and the receiving step may be performed by a processing unit (a processor). For functions of a specific unit, refer to a corresponding method embodiment. There may be one or more processors.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The access device and the terminal device in the foregoing apparatus embodiments exactly correspond to the access device and the terminal device in the method embodiments. A corresponding module or unit performs a corresponding step. For example, a communications unit (a transceiver) performs a receiving step or a sending step in the method embodiments, and a step other than the sending step and the receiving step may be performed by a processing unit (a processor). For functions of a specific unit, refer to a corresponding method embodiment. There may be one or more processors.

Terms such as "component", "module", and "system" used in this specification are used to indicate a computer-related entity, hardware, firmware, a combination of hardware and software, software, or software being executed. For example, the component may be but is not limited to a process that runs on a processor, a processor, an object, an executable file, an execution thread, a program, and/or a computer. As shown in the figures, both a computing device and an application that runs on the computing device may be components. One or more components may reside in a process and/or an execution thread, and a component may be located on one computer and/or distributed between two or more computers. In addition, these components may be executed by various computer-readable media that store various data structures. The components may communicate with each other by using a local and/or remote process and based on, for example, a signal having one or more data packets (for example, data from two components interacting with another component in a local system, a distributed system, and/or across a network such as the internet interacting with another system by using a signal).

A person of ordinary skill in the art may be aware that, units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

In the foregoing embodiments, all or some of the functions of the functional units may be implemented by software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, an access device, or the like) to perform all or some of the steps in the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:

determining, by a first access device, a classification of physical cell identifier (PCI) values, wherein the classification of the PCI values comprises a first type of PCI value which is used for a cell in a non-public network (NPN), the first type of PCI value comprises a sub-type of PCI value which is used only for a cell in a public network integrated NPN (PNI-NPN), one or more first PCI values of the PCI values that belong to the sub-type of PCI value are specific values reserved for the PNI-NPN, the one or more first PCI values are used to identify a first network type, and the one or more first PCI values are different from one or more second PCI values of the PCI values corresponding to a second network type; and broadcasting, by the first access device, the classification of the PCI values;

wherein the classification of the PCI values further comprises a second type of PCI value which is used only for a cell shared by a public land mobile network (PLMN) and the NPN.

2. The method according to claim 1, wherein the classification of the PCI values is broadcast in system information block (SIB).

3. The method according to claim 1, wherein the classification of the PCI values further comprises a third type of PCI value which is used only for a cell in the PLMN.

4. The method according to claim 1, wherein the classification of the PCI values comprises a plurality of types of PCI value, and each type of PCI value comprises a plurality of sub-types of PCI value.

5. The method according to claim 1, wherein the first type of PCI value comprises a second sub-type of PCI value which is used only for a cell in a standalone non-public network (SNPN).

6. A communication apparatus, comprising:

at least one processor;

one or more memories coupled to the at least one processor and storing programming instructions for execution by the at least one processor to determine a classification of physical cell identifier (PCI) values, wherein the classification of the PCI values comprises a first type of PCI value which is used for a cell in a non-public network (NPN), the first type of PCI value comprises a sub-type of PCI value which is used only for a cell in a public network integrated NPN (PNI-NPN), one or more first PCI values of the PCI values that belong to the sub-type of PCI value are specific values reserved for the PNI-NPN, the one or more first PCI values are used to identify a first network type, and the one or more first PCI values are different from one or more second PCI values of the PCI values corresponding to a second network type; and a transceiver, configured to broadcast the classification of the PCI values;

wherein the classification of the PCI values further comprises a second type of PCI value which is used only for a cell shared by a public land mobile network (PLMN) and the NPN.

7. The apparatus according to claim 6, wherein the classification of the PCI values is broadcast in system information block (SIB).

8. The apparatus according to claim 6, wherein the classification of the PCI values further comprises a third type of PCI value which is used only for a cell in the PLMN.

9. The apparatus according to claim 6, wherein the classification of the PCI values comprises a plurality of types of PCI value, and each type of PCI value comprises a plurality of sub-types of PCI value.

10. The apparatus according to claim 6, wherein the first type of PCI value comprises a second sub-type of PCI value which is used only for a cell in a standalone non-public network (SNPN).

11. A non-transitory computer-readable storage medium, comprising a computer program which, when run on a computer, causes the computer to perform operations comprising:

determining a classification of physical cell identifier (PCI) values, wherein the classification of the PCI values comprises a first type of PCI value which is used for a cell in a non-public network (NPN), the first type of PCI value comprises a sub-type of PCI value which is used only for a cell in a public network integrated NPN (PNI-NPN), one or more first PCI values of the PCI values that belong to the sub-type of PCI value are specific values reserved for the PNI-NPN, the one or more first PCI values are used to identify a first network type, and the one or more first PCI values are different from one or more second PCI values of the PCI values corresponding to a second network type; and broadcasting the classification of the PCI values;

wherein the classification of the PCI values further comprises a second type of PCI value which is used only for a cell shared by a public land mobile network (PLMN) and the NPN.

12. The medium according to claim 11, wherein the classification of the PCI values is broadcast in system information block (SIB).

13. The medium according to claim 11, wherein the classification of the PCI values further comprises a third type of PCI value which is used only for a cell in the PLMN.

14. The medium according to claim 11, wherein the classification of the PCI values comprises a plurality of types of PCI value, and each type of PCI value comprises a plurality of sub-types of PCI value.

15. The medium according to claim 11, wherein the first type of PCI value comprises a second sub-type of PCI value which is used only for a cell in a standalone non-public network (SNPN).

* * * * *